United States Patent
Krivenok

(10) Patent No.: US 11,070,431 B2
(45) Date of Patent: Jul. 20, 2021

(54) SYSTEM AND METHOD FOR NETWORK VALIDATION ARCHITECTURE FOR CLUSTERED AND FEDERATED STORAGE SYSTEMS

(71) Applicant: EMC IP HOLDING COMPANY, LLC, Hopkinton, MA (US)

(72) Inventor: Dmitry Krivenok, St. Petersburg (RU)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 16/874,981

(22) Filed: May 15, 2020

(65) Prior Publication Data
US 2021/0028987 A1    Jan. 28, 2021

(30) Foreign Application Priority Data

Jul. 23, 2019  (RU) .......................... RU2019123157

(51) Int. Cl.
*H04L 12/24* (2006.01)
*H04L 29/08* (2006.01)

(52) U.S. Cl.
CPC ...... *H04L 41/0886* (2013.01); *H04L 41/0816* (2013.01); *H04L 41/0853* (2013.01); *H04L 41/0869* (2013.01); *H04L 67/1097* (2013.01)

(58) Field of Classification Search
CPC ............ H04L 41/0886; H04L 41/0853; H04L 41/0816; H04L 41/0869; H04L 67/1097
See application file for complete search history.

(56) References Cited

U.S. PATENT DOCUMENTS

| | | | | |
|---|---|---|---|---|
| 2008/0065748 A1* | 3/2008 | Brisse | ................ | H04L 67/1097 709/220 |
| 2013/0346260 A1* | 12/2013 | Jubran | .................. | G06F 9/5072 705/28 |
| 2020/0351157 A1* | 11/2020 | Patterson | ............ | H04L 41/0672 |

\* cited by examiner

*Primary Examiner* — Kim T Nguyen
(74) *Attorney, Agent, or Firm* — Brian J. Colandreo; Mark H. Whittenberger; Holland & Knight LLP

(57) ABSTRACT

A method, computer program product, and computer system for performing, by a single unified architecture, an initial network validation, wherein the initial network validation may be performed before a storage cluster is fully configured. The single unified architecture may perform a cluster expansion validation, wherein the cluster expansion validation may be performed before at least one of a new storage application and a new storage controller is added into the storage cluster. The single unified architecture may perform a pre-reconfiguration validation, wherein the pre-reconfiguration validation may be performed as a network reconfiguration operation in the storage cluster before a network reconfiguration request is processed. The single unified architecture may perform ongoing network validation, wherein the ongoing network validation may be performed periodically as a background process.

20 Claims, 15 Drawing Sheets

SYSTEM AND METHOD FOR NETWORK VALIDATION ARCHITECTURE FOR CLUSTERED AND FEDERATED STORAGE SYSTEMS

RELATED APPLICATIONS

This application claims priority to Russian Patent Application No. 2019123157, filed on Jul. 23, 2019, the contents of which is herein incorporated by reference in its entirety.

BACKGROUND

Network configuration is often considered the most complicated part of the deployment of heterogeneous storage clusters (or any other clustered systems with complex network configuration and requirements). Storage controllers generally need to be properly cabled to multiple network fabrics, physical switches should be correctly configured, all infrastructure services should be reachable, IP addresses should not have duplicates in the corresponding Virtual Local Area Networks (VLANs), the VLANs should be properly configured everywhere, etc. Typically, people make mistakes and hardware tends to fail periodically.

BRIEF SUMMARY OF DISCLOSURE

In one example implementation, a method, performed by one or more computing devices, may include but is not limited to performing, by a single unified architecture, an initial network validation, wherein the initial network validation may be performed before a storage cluster is fully configured. The single unified architecture may perform a cluster expansion validation, wherein the cluster expansion validation may be performed before at least one of a new storage application and a new storage controller is added into the storage cluster. The single unified architecture may perform a pre-reconfiguration validation, wherein the pre-reconfiguration validation may be performed as a network reconfiguration operation in the storage cluster before a network reconfiguration request is processed. The single unified architecture may perform ongoing network validation, wherein the ongoing network validation may be performed periodically as a background process.

One or more of the following example features may be included. The single unified architecture may include cluster-wide validation business logic supporting heterogeneous storage clusters, multiple network fabrics, and asymmetric network connectivity. The single unified architecture may include native multi-source and multi-protocol support in a core network validation business logic and validation services. Resolution suggestions may be provided for all found issues based on multiple sources of information and validation report compaction. The ongoing network validation may be an automatic passive network validation. Testing and qualification of the core network validation business logic may occur without hardware test beds and fault injection frameworks. Data may be gathered from heterogeneous network switches in the storage cluster based on multi-vendor templates, wherein the multi-vendor templates may be decoupled from a core software stack of the storage cluster and may be configured to be installed and updated independently.

In another example implementation, a computing system may include one or more processors and one or more memories configured to perform operations that may include but are not limited to performing, by a single unified architecture, an initial network validation, wherein the initial network validation may be performed before a storage cluster is fully configured. The single unified architecture may perform a cluster expansion validation, wherein the cluster expansion validation may be performed before at least one of a new storage application and a new storage controller is added into the storage cluster. The single unified architecture may perform a pre-reconfiguration validation, wherein the pre-reconfiguration validation may be performed as a network reconfiguration operation in the storage cluster before a network reconfiguration request is processed. The single unified architecture may perform ongoing network validation, wherein the ongoing network validation may be performed periodically as a background process.

One or more of the following example features may be included. The single unified architecture may include cluster-wide validation business logic supporting heterogeneous storage clusters, multiple network fabrics, and asymmetric network connectivity. The single unified architecture may include native multi-source and multi-protocol support in a core network validation business logic and validation services. Resolution suggestions may be provided for all found issues based on multiple sources of information and validation report compaction. The ongoing network validation may be an automatic passive network validation. Testing and qualification of the core network validation business logic may occur without hardware test beds and fault injection frameworks. Data may be gathered from heterogeneous network switches in the storage cluster based on multi-vendor templates, wherein the multi-vendor templates may be decoupled from a core software stack of the storage cluster and may be configured to be installed and updated independently.

In another example implementation, a computer program product may reside on a computer readable storage medium having a plurality of instructions stored thereon which, when executed across one or more processors, may cause at least a portion of the one or more processors to perform operations that may include but are not limited to performing, by a single unified architecture, an initial network validation, wherein the initial network validation may be performed before a storage cluster is fully configured. The single unified architecture may perform a cluster expansion validation, wherein the cluster expansion validation may be performed before at least one of a new storage application and a new storage controller is added into the storage cluster. The single unified architecture may perform a pre-reconfiguration validation, wherein the pre-reconfiguration validation may be performed as a network reconfiguration operation in the storage cluster before a network reconfiguration request is processed. The single unified architecture may perform ongoing network validation, wherein the ongoing network validation may be performed periodically as a background process.

One or more of the following example features may be included. The single unified architecture may include cluster-wide validation business logic supporting heterogeneous storage clusters, multiple network fabrics, and asymmetric network connectivity. The single unified architecture may include native multi-source and multi-protocol support in a core network validation business logic and validation services. Resolution suggestions may be provided for all found issues based on multiple sources of information and validation report compaction. The ongoing network validation may be an automatic passive network validation. Testing and qualification of the core network validation business logic may occur without hardware test beds and fault injection frameworks. Data may be gathered from heterogeneous network switches in the storage cluster based on multi-vendor templates, wherein the multi-vendor templates may be decoupled from a core software stack of the storage cluster and may be configured to be installed and updated independently.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
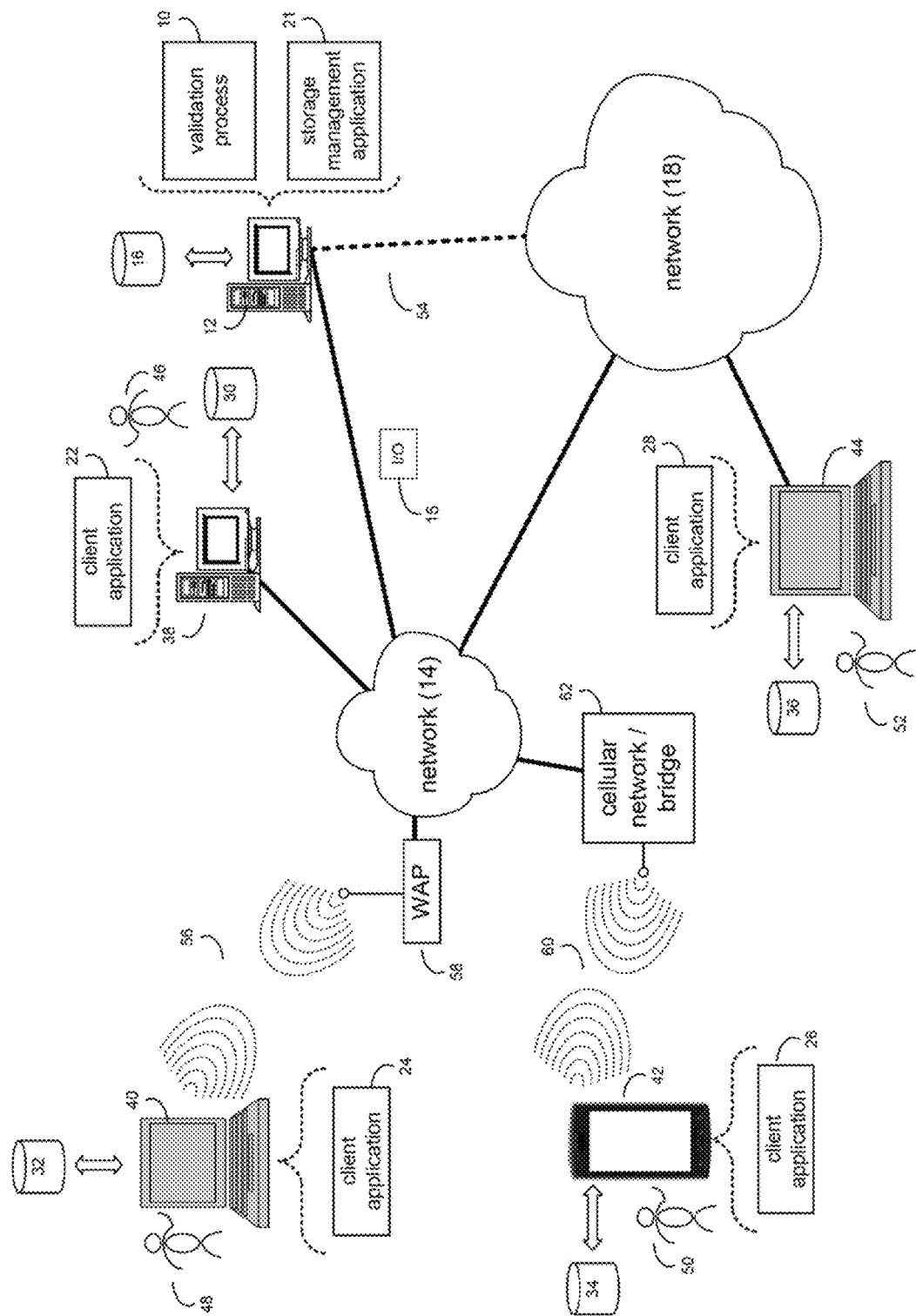
FIG. 1 is an example diagrammatic view of a validation process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown validation process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a validation process, such as validation process 10 of FIG. 1, may perform, by a single unified architecture, an initial network validation, wherein the initial network validation may be performed before a storage cluster is fully configured. The single unified architecture may perform a cluster expansion validation, wherein the cluster expansion validation may be performed before at least one of a new storage application and a new storage controller is added into the storage cluster. The single unified architecture may perform a pre-reconfiguration validation, wherein the pre-reconfiguration validation may be performed as a network reconfiguration operation in the storage cluster before a network reconfiguration request is processed. The single unified architecture may perform ongoing network validation, wherein the ongoing network validation may be performed periodically as a background process.

In some implementations, the instruction sets and subroutines of validation process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, validation process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, validation process 10 and/or storage management application 21 may be accessed via one or more of client applications 22, 24, 26, 28. In some implementations, validation process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within validation process 10, a component of validation process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of validation process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of validation process 10 (and vice versa). Accordingly, in some implementations, validation process 10 may be a purely server-side application, a purely client-side application, or a hybrid server-side/client-side application that is cooperatively executed by one or more of client applications 22, 24, 26, 28 and/or validation process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, validation process 10, and storage management application 21, taken singly or in any combination, may effectuate some or all of the same functionality, any description of effectuating such functionality via one or more of client applications 22, 24, 26, 28, validation process 10, storage management application 21, or combination thereof, and any described interaction(s) between one or more of client applications 22, 24, 26, 28, validation process 10, storage management application 21, or combination thereof to effectuate such functionality, should be taken as an example only and not to limit the scope of the disclosure.

In some implementations, one or more of users 46, 48, 50, 52 may access computer 12 and validation process 10 (e.g., using one or more of client electronic devices 38, 40, 42, 44) directly through network 14 or through secondary network 18. Further, computer 12 may be connected to network 14 through secondary network 18, as illustrated with phantom link line 54. Validation process 10 may include one or more user interfaces, such as browsers and textual or graphical user interfaces, through which users 46, 48, 50, 52 may access validation process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
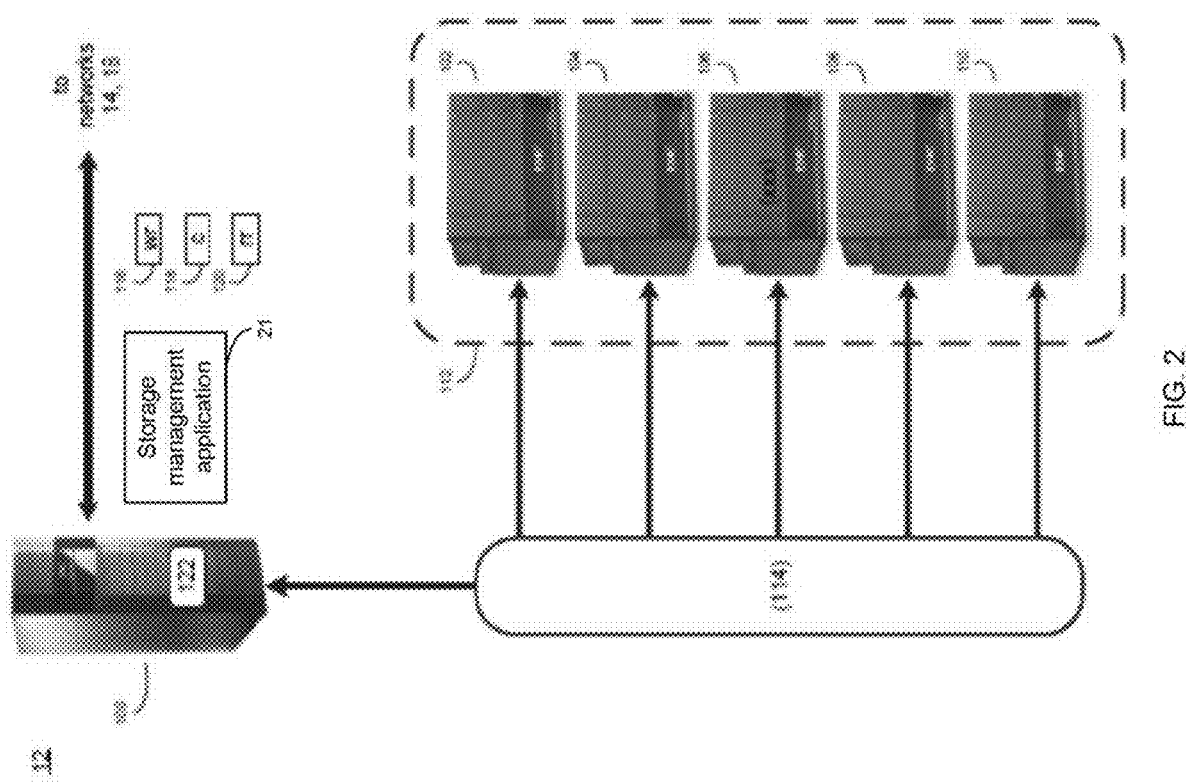
FIG. 2 is an example diagrammatic view of a storage system of FIG. 1 according to one or more example implementations of the disclosure.
Figure 3:
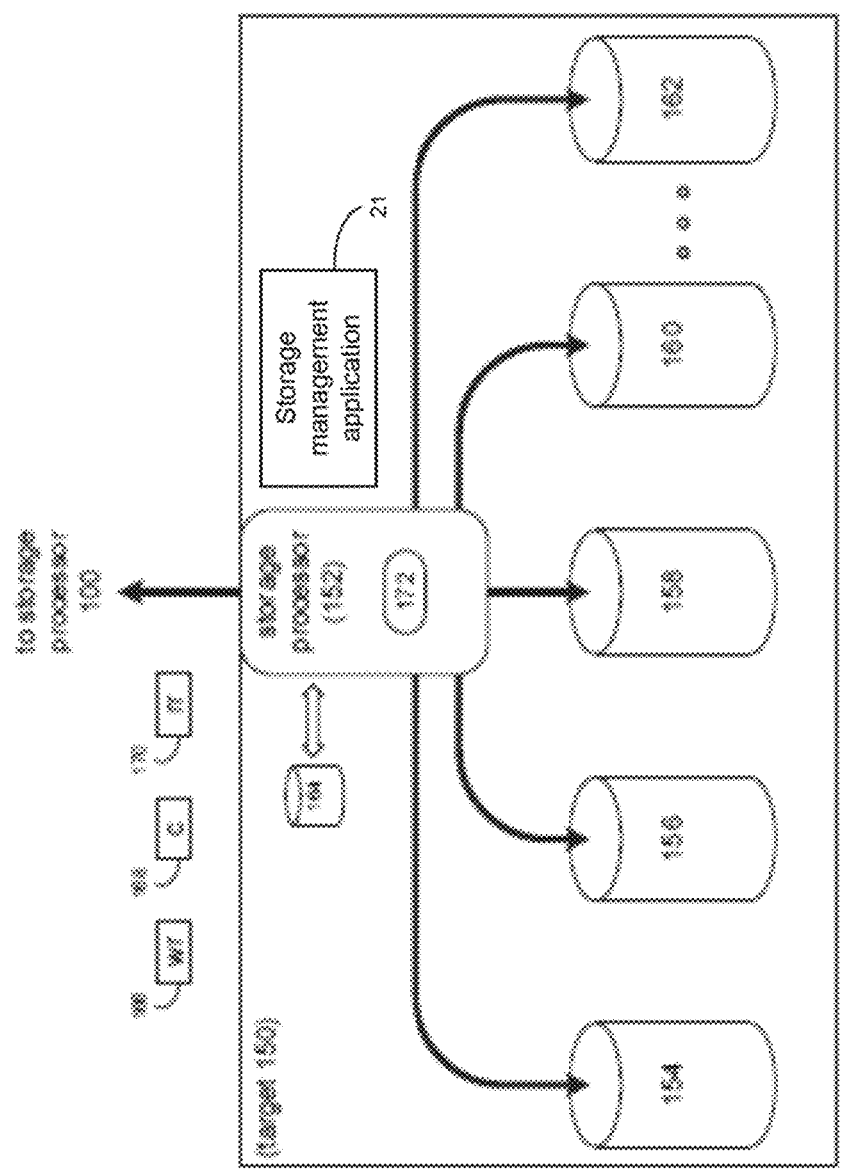
FIG. 3 is an example diagrammatic view of a storage target of FIG. 1 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™ system offered by Dell EMC™ of Hopkinton, Mass.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or validation process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VNX™ system offered by Dell EMC™ of Hopkinton, Mass. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

As noted above, network configuration is often considered the most complicated part of the deployment of heterogeneous storage clusters (or any other clustered systems with complex network configuration and requirements). Storage controllers generally need to be properly cabled to multiple network fabrics, physical switches should be correctly configured, all infrastructure services should be reachable, IP addresses should not have duplicates in the corresponding Virtual Local Area Networks (VLANs), the VLANs should be properly configured everywhere, etc. Typically, people make mistakes and hardware tends to fail periodically. It becomes important for the large and complex storage clusters to have advanced network validation support which covers all aspects of system lifetime (e.g., initial deployment, all kinds of reconfiguration, steady state, etc.).

Therefore, as will be discussed below, the present disclosure may introduce a new architecture and complete solution of the network validation for clustered and federated storage systems (or any other clustered systems with complex network configuration and requirements). Unlike many existing solutions and approaches, the present disclosure may include heterogeneous cluster awareness, may support most if not all types of network validation (e.g., initial network validation, cluster expansion validation, pre-reconfiguration validation and ongoing network validation) in a unified way, may support validation of multiple network fabrics, and may natively support meaningful and detailed resolution suggestions for all found issues and validation report compaction (e.g., via RCA). The present disclosure may support multiple sources of the information (e.g., link layer discovery protocols, switch configuration, runtime data etc.), multiple protocols (e.g., CDP/LLDP, SSH/SNMP/REST, etc.), may implement advanced protocol-level validation of the external infrastructure services, may support extensible template-based validation of physical switches and may be designed to work correctly with incomplete input data.

Figure 4:
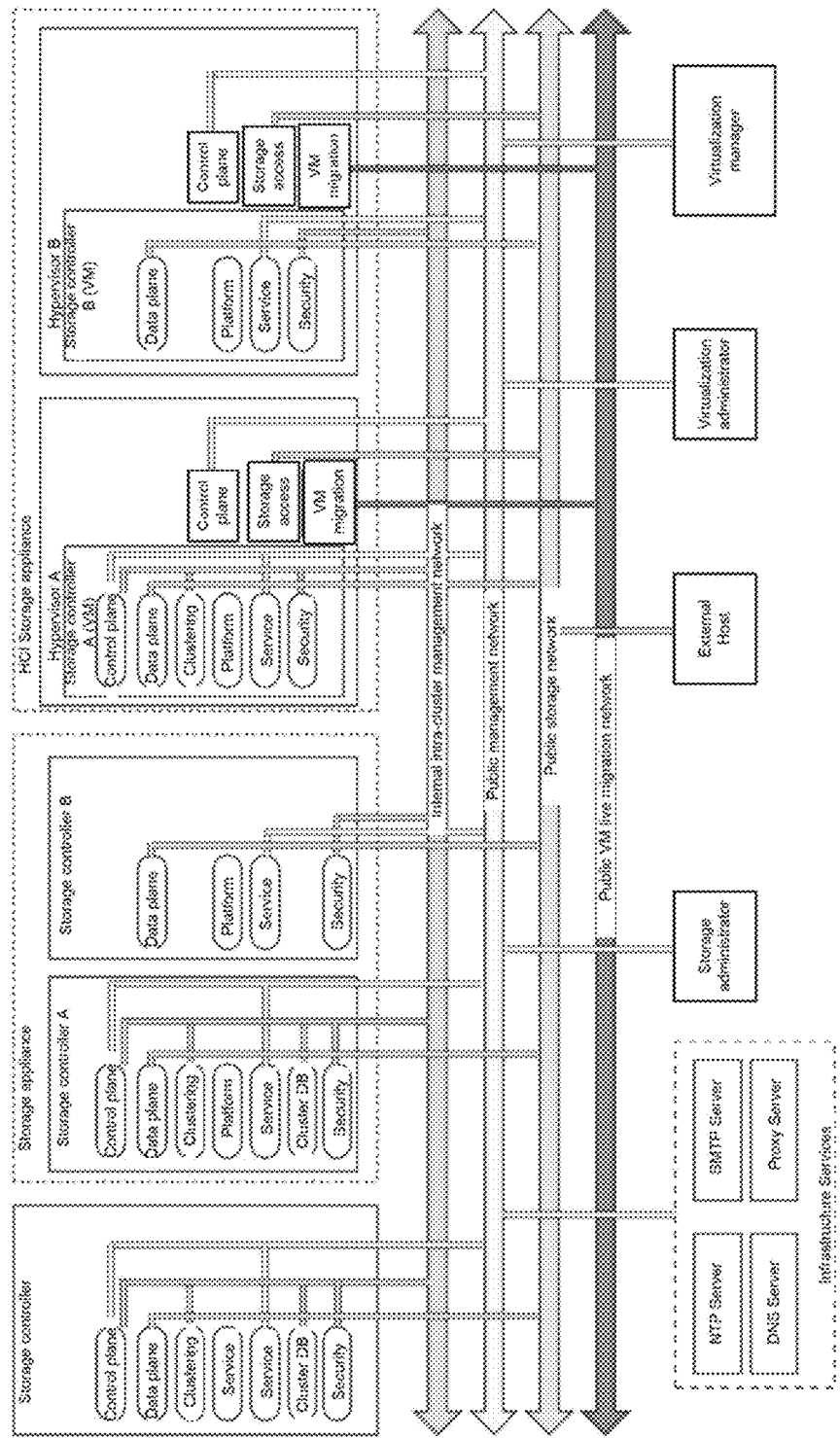
FIG. 4 is an example diagrammatic view of a heterogeneous storage clusters according to one or more example implementations of the disclosure.
Figure 5:
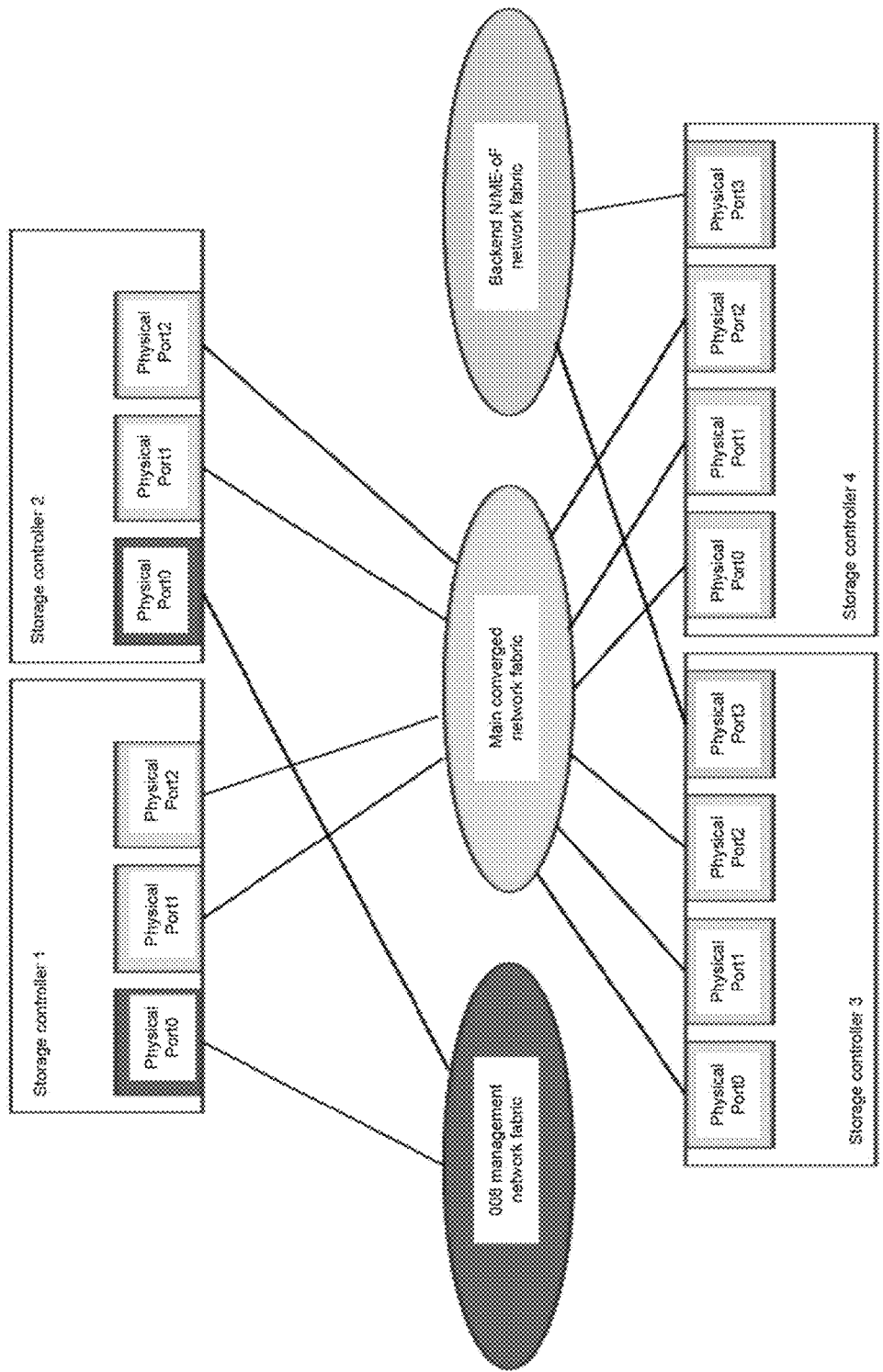
FIG. 5 is an example diagrammatic view of a heterogeneous storage clusters according to one or more example implementations of the disclosure.
Figure 6:
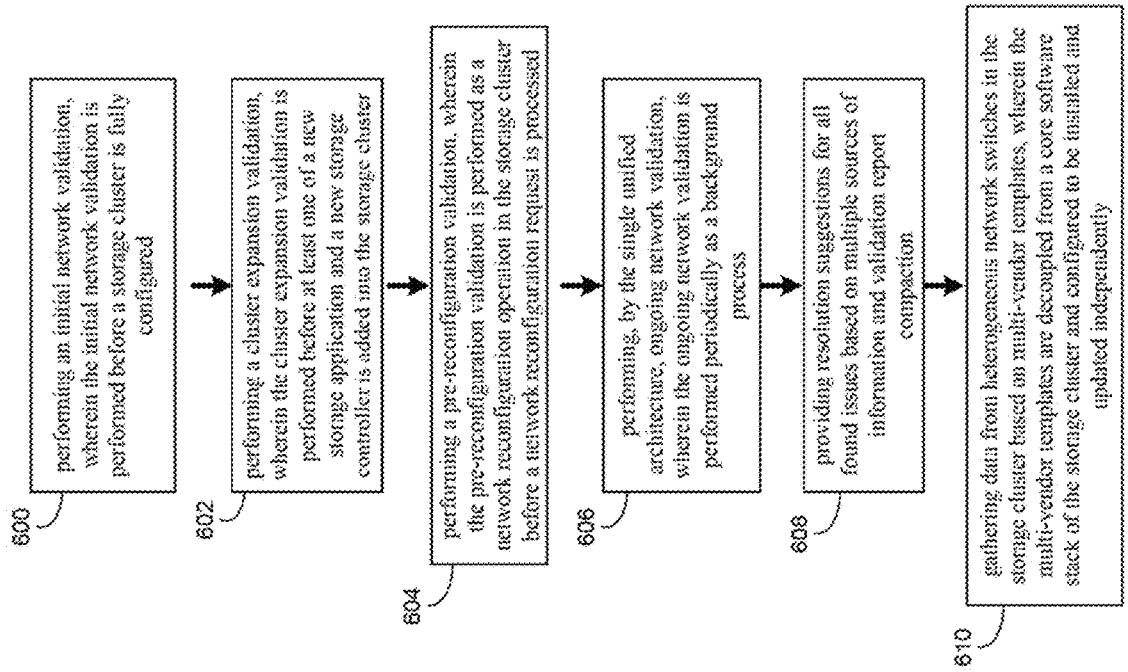
FIG. 6 is an example flowchart of a validation process according to one or more example implementations of the disclosure.

Generally, heterogeneous storage clusters may be very complicated from the networking point of view. For example, they may consist of storage-only and HCI appliances. Network configuration usually spans across multiple components such as storage-only controllers, hypervisor hosts, virtualized controllers, virtualization managers, and physical network fabrics. They may consist of appliances with different number of network ports and I/O modules. Some of those ports are uniformly configured across the cluster nodes. Others may be connected to the dedicated network fabrics due to administrative, performance, security or other reasons. They usually support several cluster-wide logical networks with different requirements and traffic patterns. Each network has IP addresses from some subnet. The network may optionally have the gateway and VLAN configured. Each network may have independent MTU configuration. They may be connected to multiple independent network fabrics at the same time, e.g. management network may be configured on top of dedicated OOB management switches. Backend data network (e.g., NVMe-oF) may be configured on top of dedicated backend switches. The rest of the networks may be configured on top of the main network fabric. The physical switches may be provided by different vendors and have different capabilities. They usually require a number of external infrastructure services, e.g., DNS servers, NTP servers, SMTP servers, proxy servers, etc., and virtualization managers. Example configurations of heterogeneous storage clusters are shown in example system configuration 400 and 500 in example FIGS. 4 and 5 respectively.

One big class of issues which may be encountered in practice is hardware related issues, for example, faulty network switches, bad cables and incompatible SFPs, faulty NICs and I/O modules, and hardware SPOFs. Another class of issues is the problem with the external infrastructure services needed for proper operation of the heterogeneous storage clusters, e.g. misconfigured DNS servers (missing zones, IP version issues, etc.), misconfigured firewalls and gateways, unreachable infrastructure services (e.g., DNS, NTP, proxy, vCenter, SCVMM), incompatible network configuration on the virtualization managers (vSwitches, port groups, QoS, etc.).

Finally, the biggest class of problems is various kinds of configuration errors, such as cabling errors (which may result in SPOFs and hence DU in case of failures), duplicate IP addresses, missing allowed VLANs on the switches, inconsistent native VLAN configuration on the switches, incorrect end-to-end MTU configuration (for Jumbo frames scenarios), incorrect configuration of ICL/ISL and port channels on the switches (including multi-chassis LAGs), incorrect port speed configured on the switch ports, incorrect port mode and STP mode configured, wrong addresses of the gateways, DNS, NTP, proxy servers, etc. As such, given the above, it becomes important to be able to validate the overall network configuration for the entire storage cluster and surrounding network environment, detect all possible issues, perform RCA if applicable and provide the users meaningful and precise resolution suggestions for each detected problem.

Many existing storage systems do not have a solid native network validation support and rely on the external tools to perform the network validation tasks. There are a number of disadvantages of the approaches based on off-array tools: they are inherently limited to the initial network validation use-case and cannot be used for other types of the network validation required by the modern clustered storage, due to off-array nature, such tools cannot catch all possible configuration and runtime problems and may produce false-positive results because all checks are performed from the external host (e.g., laptop), in order to perform the initial network validation, users are supposed to enter a lot of the configuration data into the tool (e.g., IP addresses, VLANs, DNS/NTP servers, etc.). This leads to poor user experience because the same data has to be entered once again later at the time of the initial configuration of the storage cluster. It is also less reliable because data which was validated may differ from the data actually entered due to operator error.

Such tools need to be developed and maintained for every supported OS. Moreover, unlike the disclosed native network validation solutions, the external validation tool has to be constantly kept in sync with the new requirements of the primary storage cluster. Some storage systems may have a native network validation support which is embedded into the core software stack. However, there are many limitations in these existing solutions: they do not support all network validation types (e.g., initial network validation, cluster expansion validation, pre-reconfiguration validation, and ongoing network validation), network validation is often storage controller centric and is not cluster aware, which does not allow to catch some classes of the configuration issues and makes it difficult to perform automatic RCA, they do not work for the heterogeneous storage clusters with very different networking requirements for bare-metal and virtualized controllers coexisting in the same cluster, many solutions are unable to validate multiple network fabrics and either do not support switch side validation at all or only support validation of a limited set of switch models without a way to easily add support of additional switches, validation of the infrastructure services is often done via the simple network reachability tests instead of much more reliable protocol-level validation, they do not have integration with service discovery and do not allow to catch some classes of issues even before customers first access the storage system (e.g., cabling issues, SPOFs, etc.), they are often not multi-source and multi-protocol capable which limits practical use and requires all data to be provided upfront (i.e., they cannot work with incomplete input data), and they just report the detected issues, but do not provide meaningful resolution suggestions and RCA which results in expensive service calls.

The Validation Process:

As discussed above and referring also at least to the example implementations of FIGS. 6-15, validation process 10 may perform 600, by a single unified architecture, an initial network validation, wherein the initial network validation may be performed before a storage cluster is fully configured. Validation process 10 may (e.g., via the single unified architecture) perform 602 a cluster expansion validation, wherein the cluster expansion validation may be performed before at least one of a new storage application and a new storage controller is added into the storage cluster. Validation process 10 may (e.g., via the single unified architecture) perform 604 a pre-reconfiguration validation, wherein the pre-reconfiguration validation may be performed as a network reconfiguration operation in the storage cluster before a network reconfiguration request is processed. Validation process 10 may (e.g., via the single unified architecture) perform 606 ongoing network validation, wherein the ongoing network validation may be performed periodically as a background process.

In some implementations, validation process 10 may perform 600, by a single unified architecture, an initial network validation, wherein the initial network validation may be performed before a storage cluster is fully configured. In some implementations, validation process 10 may (e.g., via the single unified architecture) perform 602 a cluster expansion validation, wherein the cluster expansion validation may be performed before at least one of a new storage application and a new storage controller is added into the storage cluster. In some implementations, validation process 10 may (e.g., via the single unified architecture) perform 604 a pre-reconfiguration validation, wherein the pre-reconfiguration validation may be performed as a network reconfiguration operation in the storage cluster before a network reconfiguration request is processed. For example, this may be performed before network reconfiguration request is processed by the system to make sure that the desired change is valid. For instance, if a user wants to change VLAN ID from 10 to 20, the pre-reconfiguration validation checks that new VLAN ID 20 is enabled on the switches before applying the change. In some implementations, validation process 10 may (e.g., via the single unified architecture) perform 606 ongoing network validation, wherein the ongoing network validation may be performed periodically as a background process. For example, as will be discussed in greater detail below, validation process 10 may (e.g., via the single unified architecture) include a new comprehensive network validation approach which should cover all network validation use-cases faced by modern clustered storage. That is, validation process 10 may perform the following types of network validation:

Initial network validation (INV)—performed before the storage cluster is fully configured.

Cluster expansion validation (CEV)—performed before a new storage appliance or storage controller is added into the storage cluster.

Pre-reconfiguration validation (PRV)—performed right before network reconfiguration operation in the storage cluster (e.g., change of cluster-wide subnet, change of MTU, etc.).

Ongoing network validation (ONV)—periodic ongoing network validation running in the background.

Table 1A below summarizes the important differences and commonalities between those network validation types.

TABLE 1A

| Aspect | INV | CEV | PRV | ONV |
|---|---|---|---|---|
| Triggered by the user action | Yes, the creation of the storage cluster | Yes, adding a new appliance/ controller into the existing cluster | Yes, explicit network reconfiguration request by the user | No |
| Input for the validation | Everything is provided by the user | Provided by the user and taken from the cluster persistence | Provided by the user and taken from the cluster persistence | Taken from the cluster persistence |
| Communication network between storage appliances in the cluster | Initial discovery network | Initial discovery network | Intra-cluster management network | Intra-cluster management network |

TABLE 1A-continued

| Aspect | INV | CEV | PRV | ONV |
|---|---|---|---|---|
| State of the cluster software stack | Not fully initialized on all appliances | Fully initialized on all appliances except one being added | Fully initialized on all appliances | Fully initialized on all appliances |
| Network configuration parameters (e.g. MTU on the ports, type of LAGs, etc) | Always default | Always default on the appliance being added and may be non-default on other appliances | Any supported config. | Any supported config. |
| Requires a temporary management network | Yes, because only a discovery network is available on all appliances | Usually yes, because only a discovery network is available on the appliance being added | Depends on what's being changed | No |
| Requires an isolated network sandbox for the validation | No, the appliance does not have any persistent network config. yet, so sandbox is not required | No, the appliance does not have any persistent network configuration yet, so sandbox is not required | Usually yes, an isolated network sandbox is required to validate a new network config. without affecting the production one | No |
| Reporting of the found issues | Cluster-wide validation report generated by the API call | Cluster-wide validation report generated by the API call | Errors returned by the network reconfiguration API call | New alerts generated and associated with relevant network objects. Health state of the relevant network objects is updated. |

The present disclosure offers a software architecture which should enable all network validation use-cases mentioned throughout in a unified way with as much components reuse as possible. Notably, the network validation must always be cluster-wide. Two individual storage appliances may be configured perfectly fine if considered independently, but their network configuration may prevent them from being clustered. Because of that, validation process 10 may be implemented as a core network validation orchestration and business logic in the distributed control plane of the storage cluster.

For example, validation process 10 via a master appliance in the storage cluster (more specifically, its control plane) may be responsible for: orchestration of the cluster-wide network validation, communication with remote storage appliances in order to gather the information from them and offload appliance-specific validation checks there, concurrency control to avoid multiple simultaneous validation processes.

Validation process 10 via a control plane of any appliance (both master and slave) may be responsible for: communication with different validation backend services on the local storage controller via the common validation frontend proxy component, communication with different validation backend services on the peer storage controller (for dual-controller appliances) via the common validation frontend proxy component, control plane may gather information from the platform validation backend services or offload low-level validation checks to the platform.

Validation process 10 via a platform validation component on each storage controller may be responsible for: processing commands from the local control plane, gathering the information about local node network configuration and state (state of ports, cabling information, Layer 2 discovery information, etc), offload of the low-level validation operations (protocol-level validation of infrastructure services, gathering configuration of the network switches, address conflict detection, etc.), local platform configuration (temporary network configuration, isolated network sandbox configuration, etc.)

Figure 7:
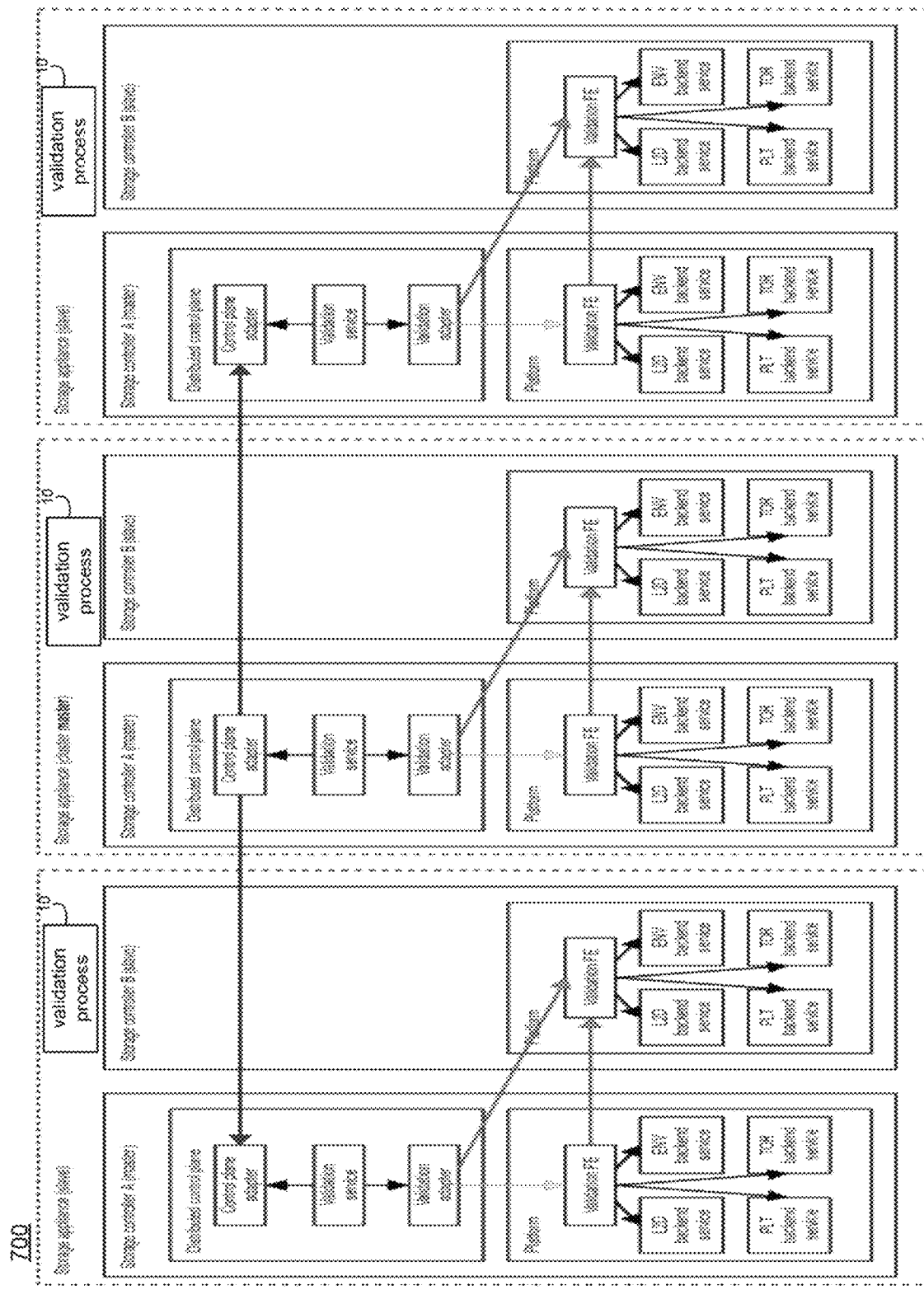
FIG. 7 is an example diagrammatic view of a storage cluster environment according to one or more example implementations of the disclosure.

Referring at least to the example implementation of FIG. 7, an example storage cluster environment 700 is shown. As will be discussed in greater detail, storage cluster environment 700 shows the example software components of the storage cluster involved in the network validation. Referring at least to the example implementation of FIG. 8, an example architecture 800 of a distributed control plane and the relevant services running on the master application of the storage cluster 700 is shown.

Figure 8:
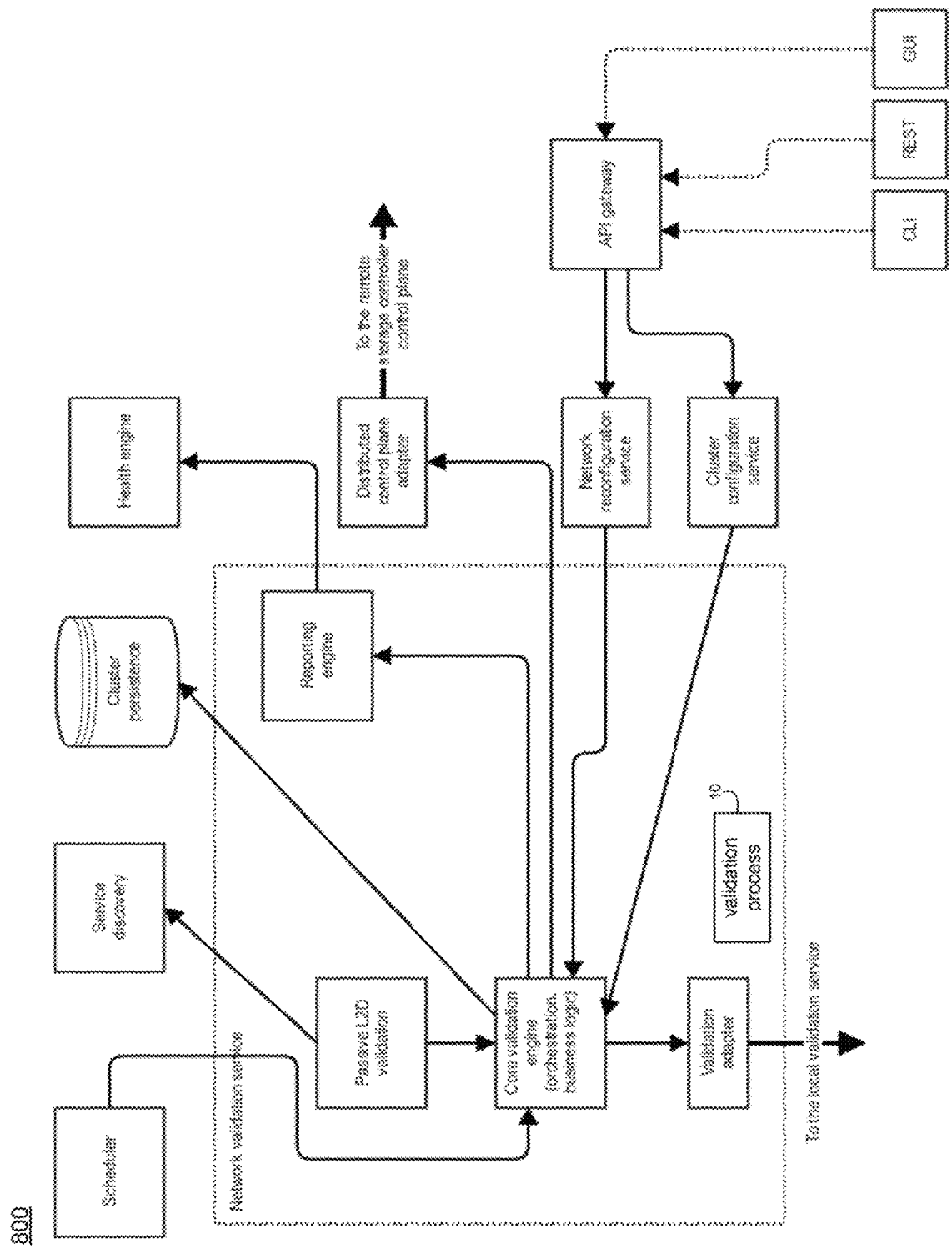
FIG. 8 is an example diagrammatic view of an architecture of a distributed control plane and services running on a master application of a storage cluster according to one or more example implementations of the disclosure.

In the example FIG. 8, the validation service in the control-plane consists of 4 primary components: a validation adapter, which is an infrastructure component that allows communicating with the validation backend services on the local appliance (with both nodes in case of dual-controller architecture), a core validation engine that is responsible for overall orchestration of the cluster-wide network validation logic for all four supported validation use-cases, a reporting engine that is responsible for different kinds of reporting of the found issues, a passive L2D (or other type of) validation that is a component which allows performing very basic validation checks even before a customer first accesses the storage appliance using local information and information obtained passively from the switches via the Layer 2 discovery protocols. This information then can be used to alter service discovery record for the appliance to indicate that it has faulted.

In some implementations, other control plane components interacting with the network validation service may include a scheduler, which is a component responsible for scheduling and execution of periodic background jobs. Generally, it is used to schedule ONV tasks.

Other control plane components interacting with the network validation service may include a service discovery component responsible for publishing service records so that the storage appliance could be discovered via protocols like mDNS/DNS-SD or SSDP. In some implementations, the ongoing network validation may be an automatic passive network validation (e.g., based on link-layer discovery protocols or other protocols). For example, a passive L2D validation component may interact with the service discovery component in order to change the state of the appliance to be advertised. Cluster persistence is a reliable persistence store (e.g., a database) where all cluster configuration may be stored. It is typically used as a source of the input data for all validation types except INV. A health engine component may be responsible for the handling of events, generation of alerts and calculation of the health for various objects in the system. ONV (which may occur in the background without involvement of the user and after the storage cluster has been deployed and configured) interacts with the health engine to update the health of components which are claimed to be faulted as a result of performed cluster-wide network validation. A distributed control plane adapter is an infrastructure component which allows exchanging commands between control plane instances on different appliances in the cluster. A network reconfiguration service is responsible for the handling of all network reconfiguration requests. At the beginning of any reconfiguration request, it communicates with the validation service to perform PRV checks. A cluster configuration service is responsible for cluster reconfiguration (i.e., adding new appliances in the cluster or removing existing appliances from the cluster). At the beginning of add appliance request, it communicates with the validation service to perform CEV checks. API gateways provide an entry point into the storage cluster and allow users to (directly or indirectly) perform different types of network validation.

A network validation subsystem of the clustered storage systems need to deal with many protocols and data sources in order to validate that the network is configured as expected. At the high-level, the validation checks may be broken down into the following areas:

User input validation is the most trivial, but at the same time one of the most important parts of the overall network validation process because the majority of network issues are results of operator errors. During this phase, validation process 10 must make sure that all necessary information is provided, check for format errors and perform very basic validation checks.

Network environment validation checks that all required external network infrastructure services are available and configured properly. This part includes the validation of services like DNS and NTP servers, vCenter server, etc. Network environment validation must be smart enough to perform protocol-level validation (e.g., to guarantee that provided IP address really belongs to the DNS server which is able to resolve names) as opposed to simple network reachability tests. Notably, all checks must be network and VLAN aware so that access to all required services is validated against the right network. Finally, one of the most important requirements for the network environment validation is the ability to detect IP address conflicts. Address conflict detection must be protocol-aware (e.g., ARP for IPv4 or ND for IPv6) and VLAN aware.

Various kinds of cabling issues are very common in practice, especially taken into account that large heterogeneous storage clusters may have different cabling schemes for storage appliances of different types. It is important to detect issues like unconnected cables, all cables connected to the same physical switch resulting into a single point of failure, data ports connected to OOB management switches, ports connected to different pairs of physical switches, etc. It is important to detect all such cabling errors and provide clear error messages to the end user so that it is easy to identify the cabling issue and fix it.

Storage clusters in almost all cases have to be connected to the physical switches. Those switches must be properly configured in accordance with the network requirements of the storage clusters. This configuration differs depending on the type of the switch (e.g., OOB management or the main switch) and the type of the storage appliance. The configuration of the switches must be validated if customers agree to provide the read-only credentials for the network fabric. The checks include but are not limited to ICL checks, native and allowed VLANs configuration, STP configuration, port channels configuration, FE port mode, configured MTU, etc.

Platform-level validation usually checks the internal consistency of the storage appliance networking and appliance side network state (e.g., link status for the ports, LACP status, etc).

Finally, the runtime connectivity checks make sure that communication between all storage cluster nodes works fine in all networks and VLANs configured. It must perform all checks taking MTU and tunneling into account and detect various kinds of network degradation due to bad hardware (e.g., NICs, cables, etc) or misconfigured intermediate nodes.

Figure 9:
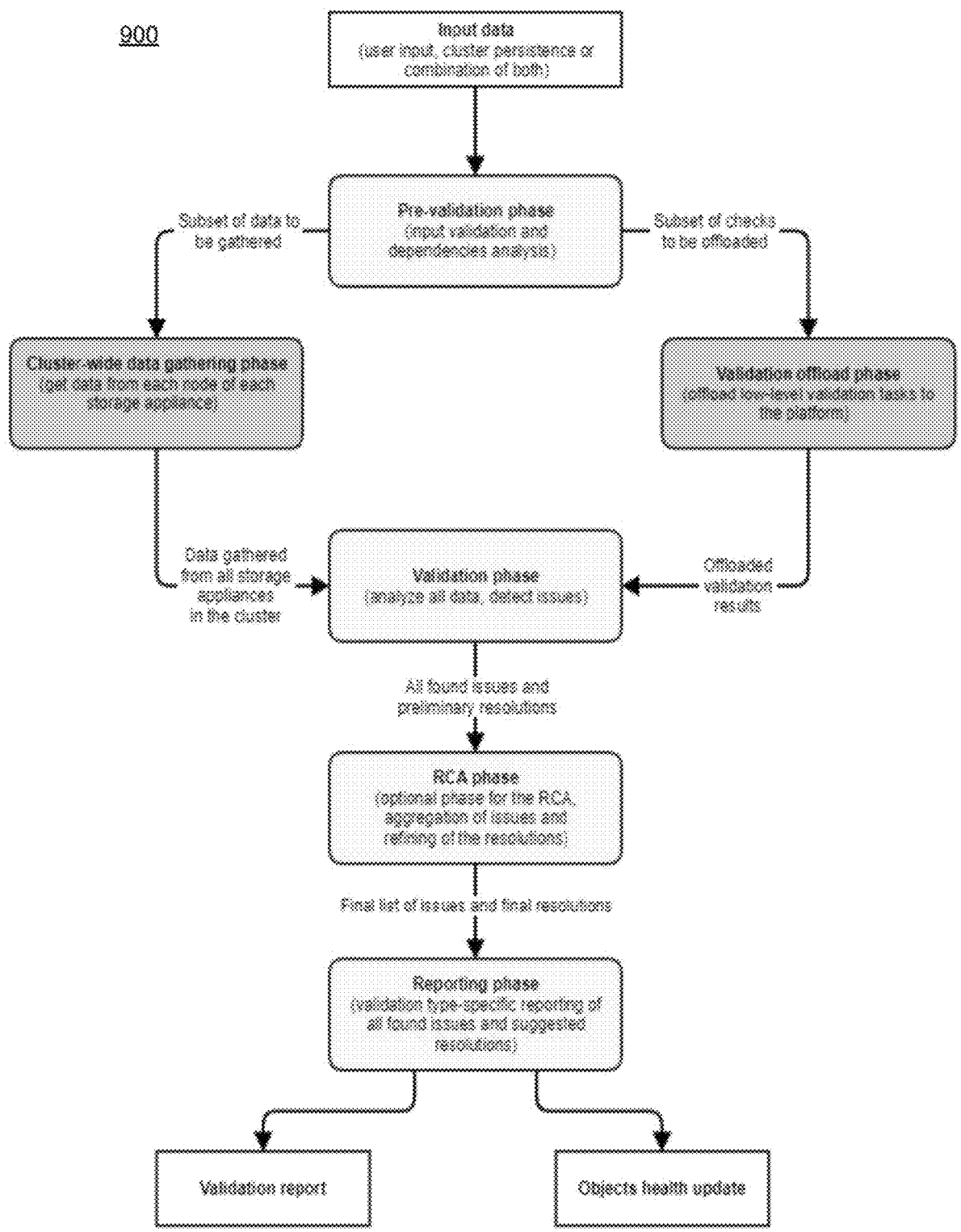
FIG. 9 is an example flowchart of various network validation phases of a validation process according to one or more example implementations of the disclosure.

Referring at least to the example implementation of FIG. 9, an example flow chart 900 of various network validation phases accomplished by validation process 10 is shown. The cluster-wide validation process may be split into different phases. For example, the pre-validation phase may perform a basic validation of the user input. This includes handling simple issues like: missing information (e.g., lack of some mandatory IP addresses), wrong format of the input data, duplicate entries (e.g., the same IP addresses specified multiple times), basic semantic errors (e.g., no default gateway for the management network while provided infrastructure services being on a different subnet).

During this phase, all checks are performed on the master appliance of the storage cluster and only use the data from the provided input. No network communication of any kind is performed at this phase for these checks. If the pre-validation phase detects one or more issues, validation process 10 does not terminate the process immediately and does not return only those errors to the user. One of the advantageous features of validation process 10 is that it tries to provide validation reports as complete as possible in order to minimize the number of times a user needs to re-run the network validation after found issues are fixed. In order to support that, pre-validation phase should be smart enough to exclude certain validation checks from the further validation process. The output of this phase therefore may be: list of found issues in the input data, and list of validation checks which must be excluded at the later phases of the validation process.

Below are some examples of excluded checks:

Provided management network does not have a gateway and provided infrastructure services (e.g., DNS, NTP, etc) are on the different subnet. In this case, it does not make sense to perform the validation of the infrastructure services because communication with them will not be possible and we will just pollute the final validation report with meaningless data.

Provided DNS server IP addresses are malformed and virtualization manager information is provided as a hostname. In this case, it does not make sense to perform any validation checks for the virtualization manager because the system will not be able to resolve its name anyway.

At the cluster-wide data gathering phase, the master appliance of the storage cluster obtains information from its local platform and asks all slave appliances to do the same. The data is obtained from, e.g., 3 backend validation services 1000 on each storage controller, as shown in the example implementation of FIG. 10:

- Layer 2 discovery service that provides the following information Detailed information about all physical ports obtained locally (e.g., admin and link status, MTU, port speed, error counters, local neighboring information, physical topology information, etc.)
- Detailed information about all switch frontend ports obtained from the physical switches via Layer 2 discovery protocols (e.g., switch ID, port ID, native VLAN, list of allowed VLANs, MTU, speed, switch IP address, switch name, port description, switch vendor, switch model and software version)
- For HCI appliances, additional information obtained from the hypervisor, e.g., name of the virtual switch consuming the port as an uplink
- Physical switch polling service provides the following information Detailed information about all switch frontend ports obtained from the physical switches via protocols like SSH, SNMP, REST or Netconf. This includes the port name and all known aliases, MAC address, MTU, speed, STP state, port channel mode, native VLAN, allowed VLANs, neighboring information, list of slave ports, etc.)
- Detailed information about all port channels obtained from the physical switches via protocols like SSH, SNMP, REST or Netconf. This includes port-channel name and all known aliases, MAC address, MTU, speed, STP state, port mode, native VLAN, allowed VLANs, neighboring information, etc.)
- Information about Inter-Chassis Link Configuration and State
- Per-VLAN MAC Table
- Platform configuration service provides the following information State of customer-visible virtual devices like bonds (a type of bond, list of slave interfaces, health state for LACP bonds, etc.)

The data obtained from different storage controllers has a backward compatible format (e.g., can be implemented via GPB or even plain JSON). At the end of the process, the master appliance has information from all storage controllers. If there were some errors, then issues are saved to be reported to the user later.

The examples of the issues are: provided credentials of the physical switches are wrong and it is not possible to gather data from them, provided addresses of the physical switches are wrong or physical switches are down, data obtained from the switches via layer 2 discovery protocols is stale.

The validation offload phase usually runs in parallel with the data gathering phase. The control plane offloads some low-level validation checks to the platform validation component. Such offloaded validation checks include: protocol-level validation of infrastructure services (e.g. NTP, DNS, SMTP, vCenter, etc.).

Address conflict detection: unlike the previous phase, the control plane receives the ready to use validation result from the platform validation component. In addition to a binary valid/invalid result, the platform component provides additional information to the control plane, e.g., the list of MAC addresses associated with the duplicate IP address, the reason for protocol-level validation failure (timeout, name resolution error, etc.)

The main validation phase is where validation process 10 analyzes all gathered information and detects configuration and runtime issues. This step is performed solely by the control plane on the master appliance and does not require any communication with other appliances or with local platform components.

One big advantage of this approach is that the core validation business logic may be thoroughly tested by simple unit tests without the need for complex network setup, complicated fault-injection scenarios, and system/integration testing.

Figure 10:
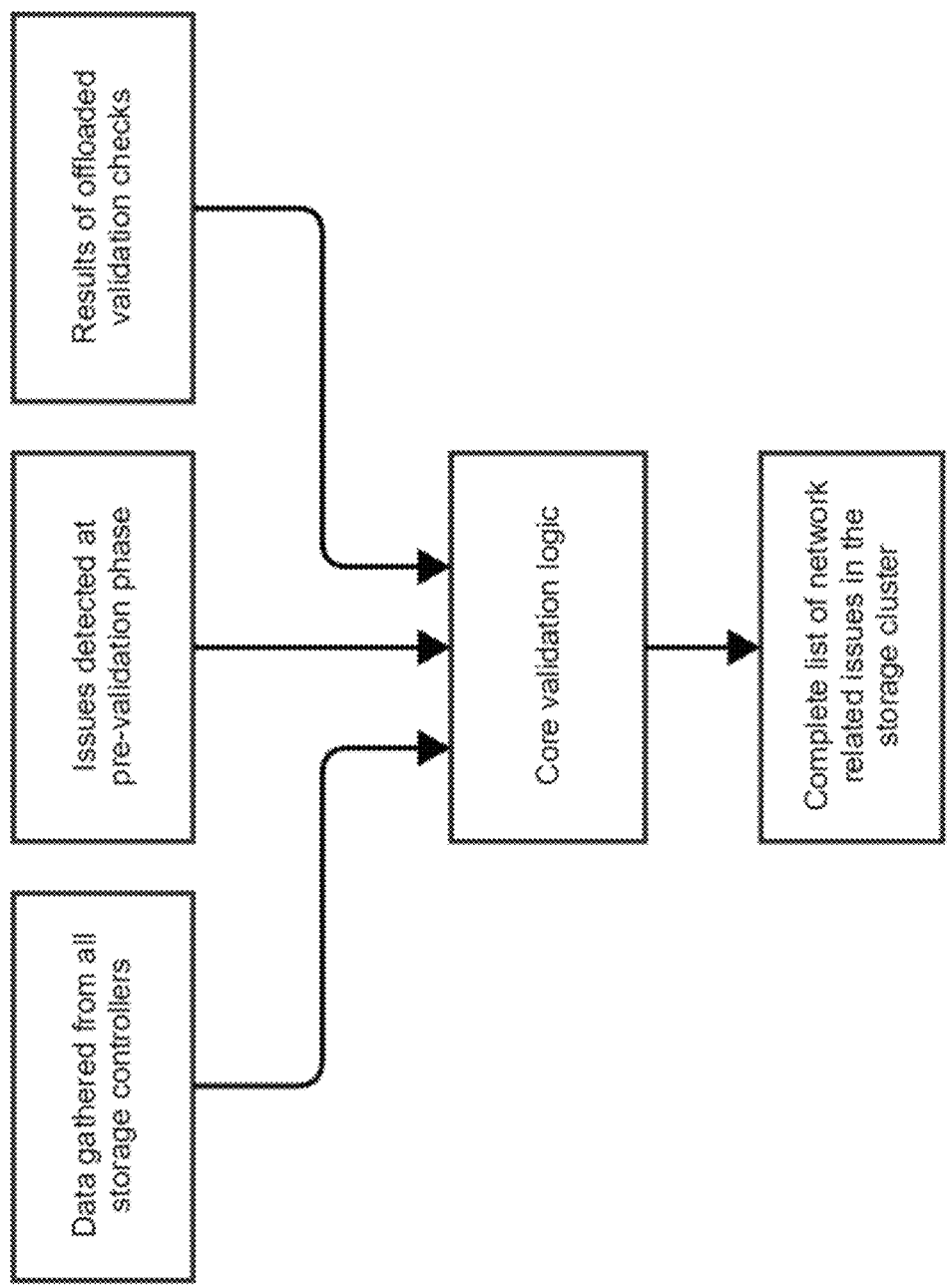
FIG. 10 is an example diagrammatic view of backend validation services of a validation process according to one or more example implementations of the disclosure.

The core validation logic of FIG. 10 is the central place which understands the desired state of the storage cluster with respect to the network configuration and actual state of the network environment and storage appliances. This component also maintains the full dependency graph between all network objects in the storage cluster.

The data processed by the core validation logic is in a standardized format (e.g., GPB, JSON, etc) and is received from all storage appliances in the cluster. A beneficial design aspect of this component is that it is supposed to work fine with partial data. For example, Layer 2 discovery protocols may be disabled on the physical switches or users may have decided not to provide even read-only access to their network fabric. In this case, certain validation checks will be just skipped without impacting the rest of the validation process. Validation process 10 may recommend the user to enable missing features in order to take full advantage of the network validation functionality provided by the storage cluster.

This component also ties together the data obtained from different backend validation services. For example, in order to validate the health of the LACP bond interface, it may use the information obtained from Layer 2 discovery protocols, port channels configuration obtained from the physical switches and LACP bond health obtained from the platform component. In addition to detecting the problem, this allows determining the exact reason why the problem has occurred. In the example with LACP bond, it could be a wrong configuration of the port channel on one of the switches. This is an example of the power of multi-source and multi-protocol support in the proposed solution.

This component not only detects the issues but also suggests the possible resolutions. For example, if the cabling issue is detected, the validation service may suggest how to remediate it by reconnecting the cables. Another example is when one of the required VLANs is not enabled on the particular FE port of some physical switch. In this case, the validation service may suggest to enable that VLAN and specify the exact place where it has to be enabled.

The output of this may be a raw list of all found issues and suggested resolutions which are associated with some scope (e.g., the entire cluster, a particular storage appliance or a particular storage node within the appliance). Table 2 below shows an example of the output:

TABLE 2

| ID | Scope | Result |
|---|---|---|
| 00 | Cluster | Error: <ERROR_MESSAGE><br>Resolution:<br><SUGGESTED_RESOLUTION_MESSAGE> |
| 00 | Appliance XYZ | Error: <ERROR_MESSAGE><br>Resolution:<br><SUGGESTED_RESOLUTION_MESSAGE> |
| 00 | Node XYZ | Error: <ERROR_MESSAGE><br>Resolution:<br><SUGGESTED_RESOLUTION_MESSAGE> |

Due to the fact that many storage clusters support some kind of localization support, instead of using the raw messages, it is possible to use pre-defined message identifiers which will then be properly localized at the reporting phase.

The Root-cause analysis (RCA) phase may be optional. The previous phase detects as many issues as possible for the available validation data sources. Even though all issues could have been detected correctly and each individual issue is valid, in some cases it is possible to reduce the number of errors reported to the end user. The main goal of the RCA phase is to determine the root cause for the detected issues and skip some issues which are assumed to be caused by the root cause issue. For example, if each storage controller is connected to a pair of physical switches via ports configured in LACP port channel and one switch fails, it usually only makes sense to report an issue about the failed switch because this information is most valuable for the end user. In most scenarios, it is not desirable to also report that 50% of ports have lost the link, that each LACP bond went into a degraded state, etc.

The RCA phase does not remove all issues detected by the previous phase but instead adds a parent-child relationship between them, as shown in the example output of Table 3. If the issue has associated parent issue, then it is assumed to be caused by that issue. All issues without the associated parent are claimed to be the root cause issues.

TABLE 3

| ID | Parent ID | Scope | Result |
|---|---|---|---|
| 001 | 002 | Cluster | Error: <ERROR_MESSAGE><br>Resolution:<br><SUGGESTED_RESOLUTION_MESSAGE> |
| 002 | | Appliance XYZ | Error: <ERROR_MESSAGE><br>Resolution:<br><SUGGESTED_RESOLUTION_MESSAGE> |
| 003 | | Node XYZ | Error: <ERROR_MESSAGE><br>Resolution:<br><SUGGESTED_RESOLUTION_MESSAGE> |

It is up to the reporting service to decide whether to show the user only reduced report, only full report or allow the user to choose between them.

The reporting is the final phase in the overall validation process. It presents all found issues and suggested resolutions to the end user. The implementation of the reporting phase heavily depends on the actual validation use-case.

For example, when INV is performed, the storage cluster is not yet initialized and validation process 10 can only present a basic report consisting of the list of all detected errors and suggested resolutions. The same is usually true for the CEV use-case.

ONV, however, is performed fully automatically in the background and the reporting is usually integrated into the health and alerts subsystem of the storage cluster. The key difference from all other validation types is that each found error is associated with the corresponding component and may impact its health state. When the issue is resolved, the health state of the object is reset back to the normal state.

It is up to the particular storage cluster to define specific user notification mechanism for the errors found by the ONV. For example, the notifications may be implemented as text messages, emails, SNMP traps, etc and may be implemented as a part of H&A subsystem of the storage cluster.

Figure 11:
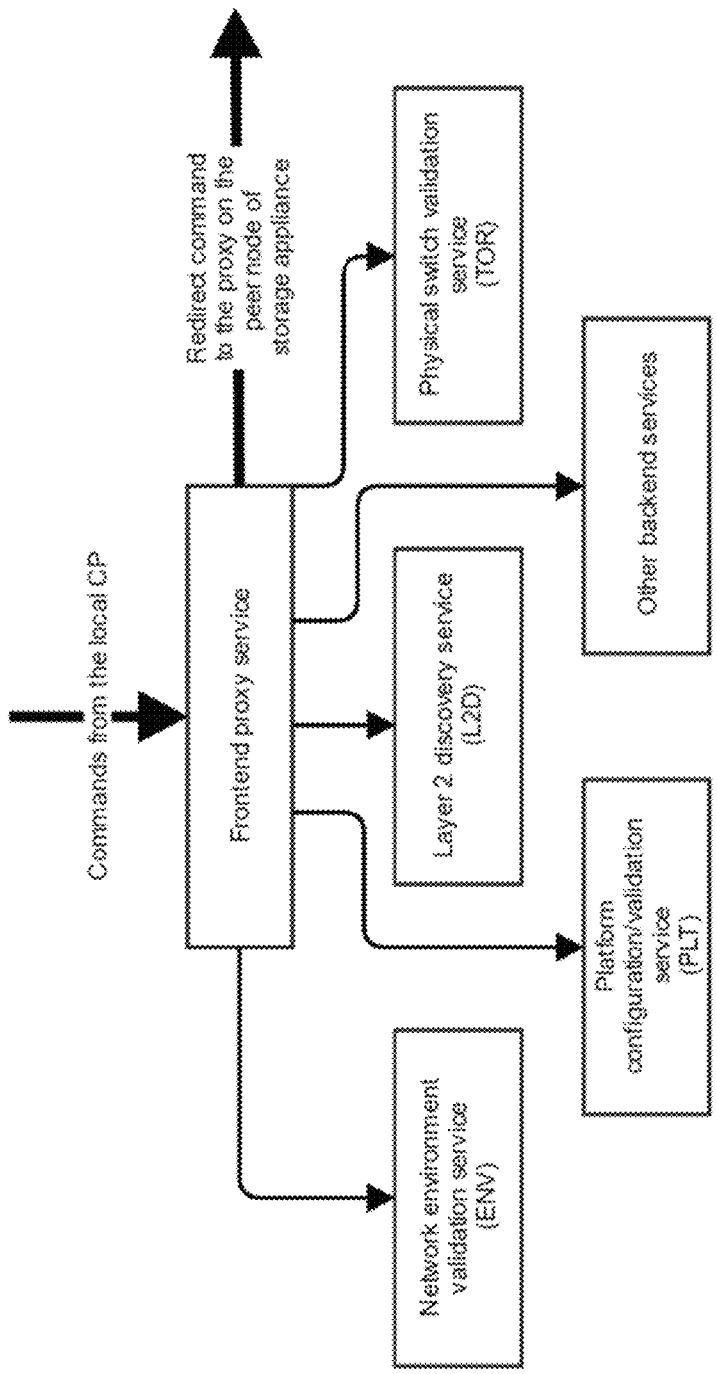
FIG. 11 is an example diagrammatic view of a high-level architecture of a platform validation infrastructure according to one or more example implementations of the disclosure.
Figure 12:
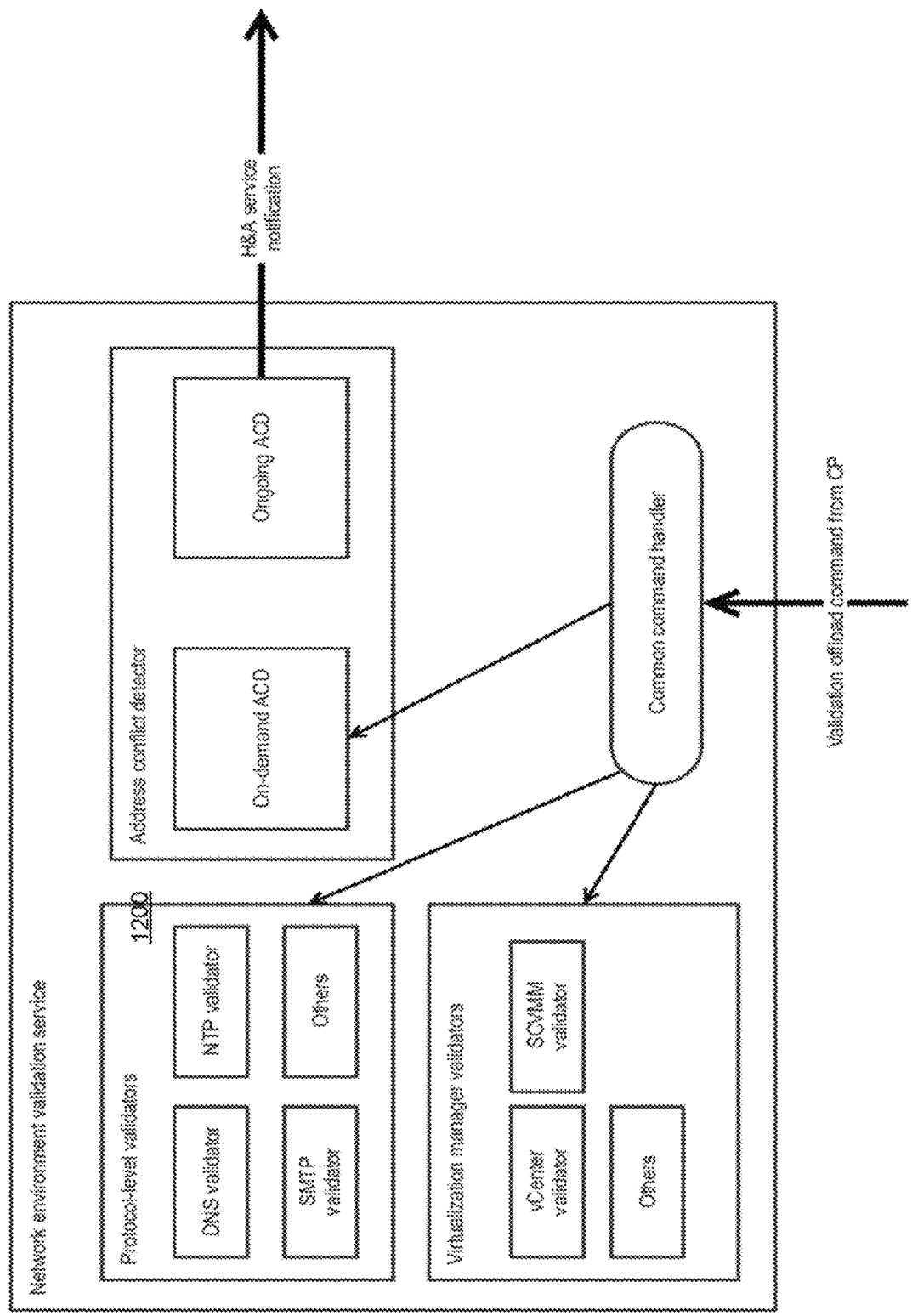
FIG. 12 is an example diagrammatic view of a network environment validation service according to one or more example implementations of the disclosure.
Figure 13:
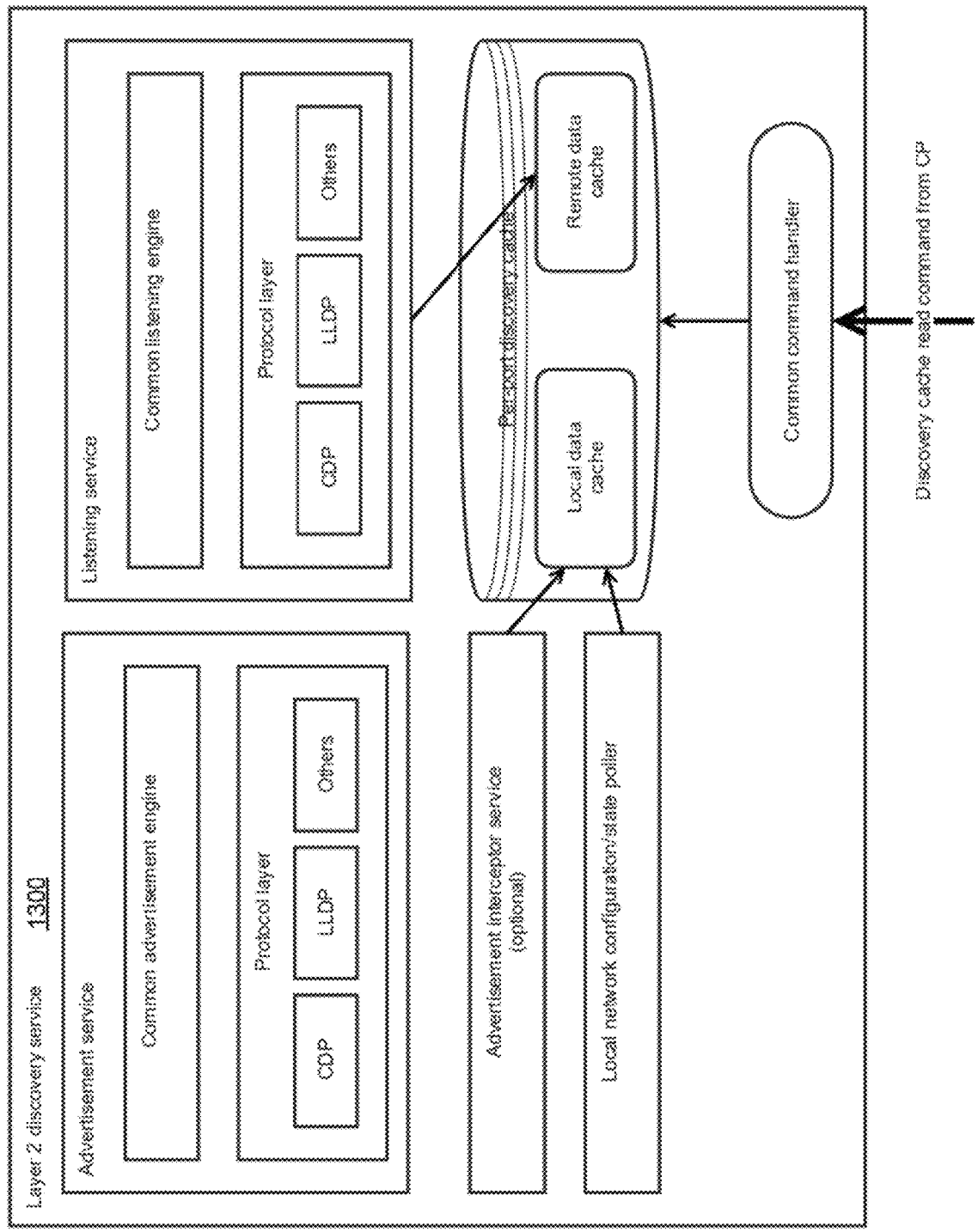
FIG. 13 is an example diagrammatic view of a Layer 2 discovery service according to one or more example implementations of the disclosure.
Figure 14:
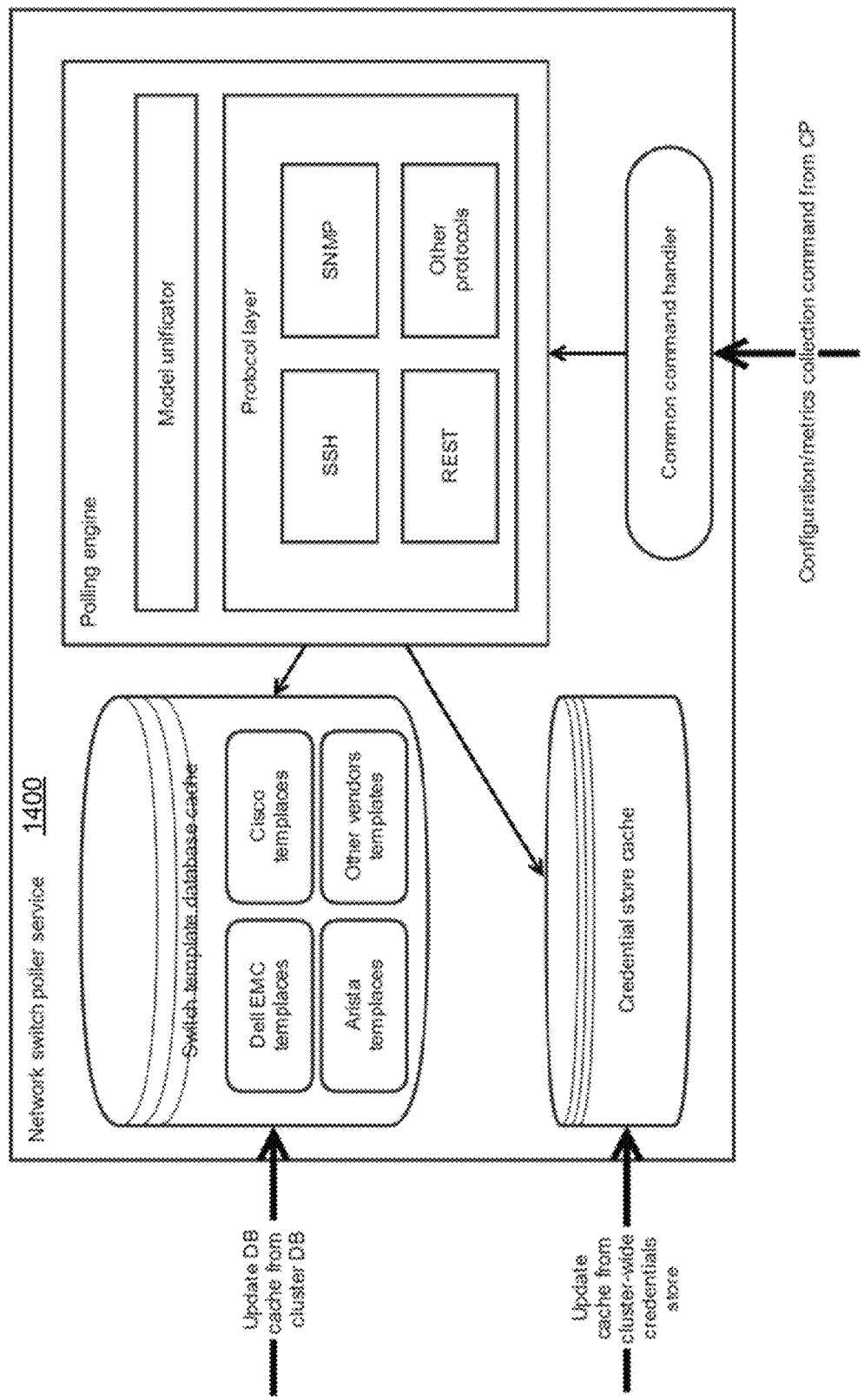
FIG. 14 is an example diagrammatic view of a network switch polling service according to one or more example implementations of the disclosure.
Figure 15:
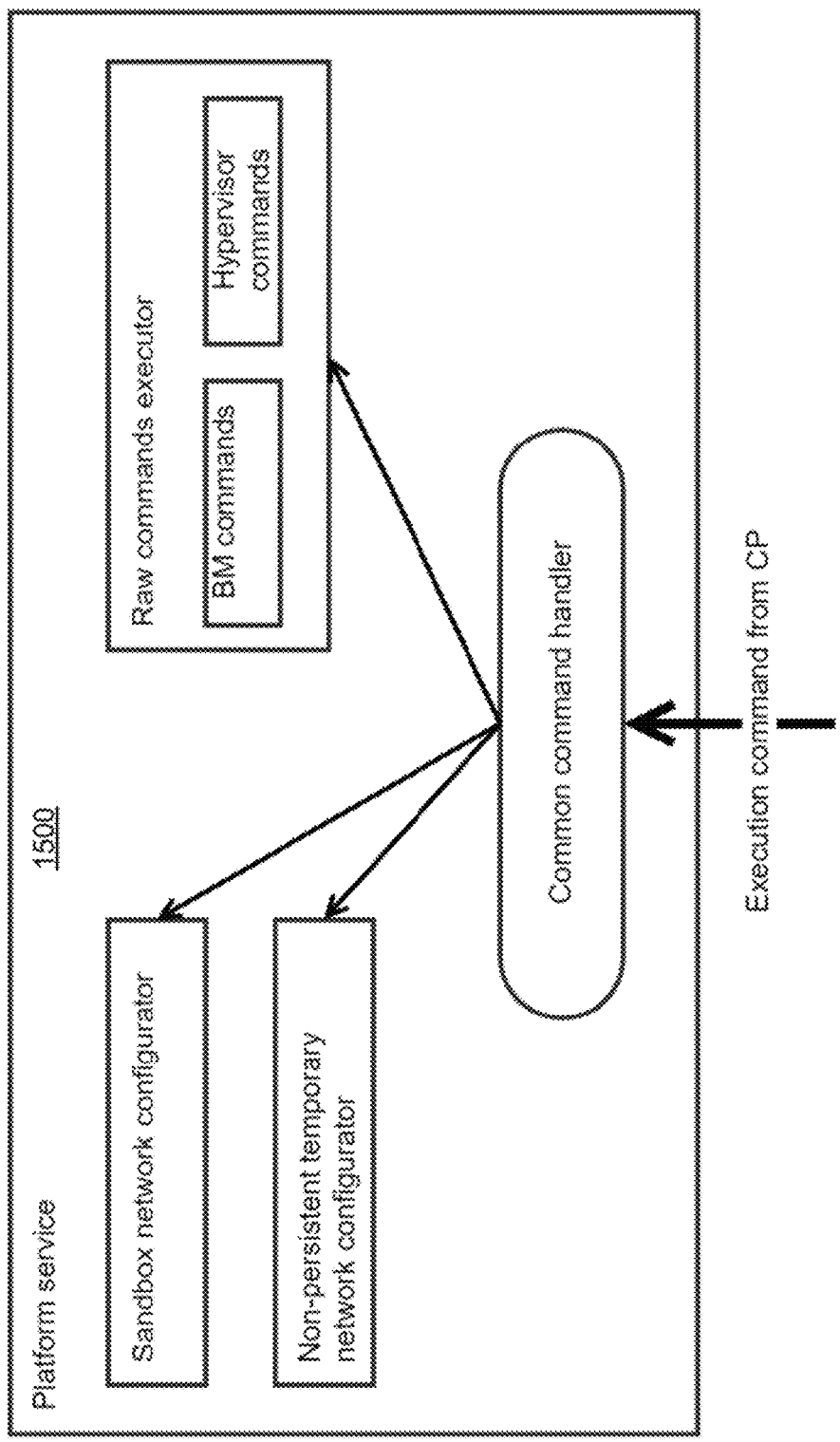
FIG. 15 is an example diagrammatic view of a platform configuration and validation service according to one or more example implementations of the disclosure.

Referring also to the example implementation of FIG. 11, an example high-level architecture 1100 of the platform validation infrastructure (for validation process 10) running on each controller of the storage cluster is shown. The platform validation infrastructure is split into the frontend proxy service and a number of backend validation services. The proxy service is responsible for the handling of the commands from the local control plane of the storage appliance and dispatching them to the backend services. On dual-controller appliances, the proxy service is also responsible for the transparent redirect of the commands to the peer controller via the intra-controller communication channel (Ethernet, PCIe, etc.). This is very useful because it allows the control plane of the storage controller to always work with a single instance of the local platform infrastructure and still be able to communicate with both controllers.

The backend validation services implement different validation tasks which are usually broken down into two main categories: offload of the low-level validation logic and gathering of the network-related data. Validation process 10 may include network environment validation service (ENV) 1200 (as shown in the example implementation of FIG. 12) is responsible for two major classes of tasks: Offload of the protocol-level validation tasks; Address conflict detection.

Heterogeneous storage clusters often require a number of external infrastructure services such as DNS, NTP, SMTP, vCenter/SCVMM servers, etc. Users supply the parameters of those infrastructure services at the cluster deployment time or later during the reconfiguration. It may be important to perform protocol-level validation as opposed to simple network reachability tests (e.g., via ICMP pings). Protocol-level validators implement network protocol-specific validation to make sure the provided IP address or hostname really belongs to the correct infrastructure service. Virtualization manager validators perform advanced validation of the virtualization managers using the API calls. Beyond performing validation of credentials, such validators implement validation of the software version, installed the license, etc. ENV service is designed to be extensible and validation of infrastructure services may be added if required by the particular storage cluster.

In large heterogeneous clusters, users usually supply lots of IP addresses for multiple networks (management, storage, VM mobility, etc.). It may be important to provide address conflict detection capabilities (ACD) to make sure provided IP addresses are not already in use by the hosts on the network. ENV ACD component is responsible for on-demand and ongoing address conflict detection. Ongoing ACD is typically used for ONV when all IP addresses are already configured on the storage nodes and conflicts may happen completely asynchronously. On-demand ACD is typically used for all other types of network validation to check if the certain IP address is not already configured on the network prior to configuring it on the storage controller. Both ACD types support detection of conflicts in a specific VLAN for both, e.g., IPv4 and IPv6 addresses, via ARP and NDP protocols respectively. If the conflict is detected, the list of MAC addresses is returned to the caller. That simplifies the network troubleshooting and helps to identify the system with a duplicate address.

Validation process 10 may include Layer 2 discovery (L2D) service 1300 (as shown in the example implementation of FIG. 13) is responsible for gathering and advertisement of the layer 2 discovery protocol PDUs. It supports standard protocols such as IEEE LLDP and vendor-specific protocols such as CDP and may be extended to the additional protocols if needed. L2D service generally consists of 4 principal components:

Listening service which is responsible for the reception of configured protocol PDUs and updating the in-memory per-port cache. This service is also responsible for filtering of fake PDUs.

Local configuration and state poller which is responsible for polling of the port configuration (e.g., MTU, speed, MAC, etc.) and port state (e.g., link status, speed, etc.) and updating the in-memory per-port cache. This component is also responsible for providing the physical location information for each port to the control plane so that it could be included in the error message.

Advertisement service is responsible for advertising the storage controller node via configured Layer 2 discovery protocols. This is needed to reliably correlate ports of the storage controller with the FE ports on the physical switches and simplifies network troubleshooting on the switch side.

Advertisement interceptor service is an optional component which is responsible for interception of the outgoing advertisements and extracting the data from them. It is generally only required when the L2D advertisements are sent by $3^{rd}$-party component, e.g., a hypervisor in case of virtual storage controller or HCI deployment.

Those components run either periodically or wait for a specific event such as reception of the PDU or change of the port state. Every physical Ethernet port of the controller has two sections in the per-port in-memory cache:

Local information which is obtained locally on the storage container.

Remote information which is obtained from L2D PDUs sent by physical switches.

L2D supports both CDP and LLDP protocols and is able to work with dual-protocol network switches. It also supports filtering of fake PDUs based on the advertised capabilities, names, and format of the mandatory chassis ID and port ID fields, the presence of PDUs from multiple protocols and suspicious changes of the IDs advertised by the remote end. Filtering may be important in a heterogeneous network environment because unrelated PDUs may be easily forwarded by switches not supporting them. This can easily break the point-to-point assumption of the link-layer discovery protocols. In case L2D detects the fake PDUs, it discards them as untrusted and bumps the internal counters so that the upper layers could report the presence of fake PDUs to the user if desired.

L2D also maintains the per-protocol age of last received PDU so that stale data could be detected and ignored. The stale information is still reported because it may be useful for the validation business logic, e.g., to report where the port was previously connected to.

As noted throughout, in some implementations, the single unified architecture may include cluster-wide validation business logic supporting heterogeneous storage clusters, multiple network fabrics, and asymmetric network connectivity. The local control plane sends the command to the L2D service to read the consistent snapshot of the cache and then uses the obtained data in network validation business logic.

As noted throughout, in some implementations, the single unified architecture may include native multi-source and multi-protocol support in a core network validation business logic and validation services. Validation process 10 may include Network switch polling (TOR) service 1400 (as shown in the example implementation of FIG. 14) which is responsible for reading configuration, metrics, and state from the physical Ethernet switches via active management protocols such as SSH, SNMP, REST, etc. TOR service is designed to work with a wide range of physical switch models from different vendors. The capabilities, data format, and supported protocols vary from vendor to vendor, so the TOR service has extensible architecture and abstracts all vendor-specific details in a template file. Template files define how to gather the necessary data via vendor specific commands and APIs. A very important feature of such a model is that the template files can installed dynamically which means it is not needed to upgrade the storage cluster itself to support a new vendor or switch model. This is especially important for the INV use-case because the upgrade is usually impossible before the storage cluster is deployed. The template files are stored in the storage cluster persistence and then propagated to the local cache of TOR service on each node.

As noted throughout, in some implementations, validation process 10 may (e.g., via the single unified architecture) gather 610 data from heterogeneous network switches in the storage cluster based on multi-vendor templates, wherein the multi-vendor templates may be decoupled from a core software stack of the storage cluster and may be configured to be installed and updated independently. Credentials of the physical switches are securely stored in the cluster-wide credentials store of the storage cluster and are also propagated to the local cache of the TOR service on each node. The format of the credentials differs between the access protocols. Some protocols support username and password pairs, some use tokens, and others are based on some form of PKI. Regardless of the protocol, the TOR service needs only read-only credentials because it does not make any changes on the physical switches.

The polling engine handles the command from the local control plane and, depending on the provided protocol and credentials, selects the appropriate protocol implemented at the protocol level. The TOR service supports the gathering of the data via multiple protocols at the same time. The caller may supply the necessary information for the template file selection (i.e., if the user supplied the vendor and model information for the physical switch or if this information is known from the L2D). However, if such information is not supplied, then the TOR service will first use the generic template file to determine the switch model and vendor and then automatically select the most appropriate template files.

Once the best template files are found, the polling engine will try to pull data via configured protocols. The model unification component is responsible for taking the results obtained via different protocols and template files and combining them into the generic, protocol and model agnostic format. For example, some data may be obtained via SSH and other data may be obtained via SNMP. The model unification component combines data from at least two sources, resolves conflicts (if any) according to the internal rules and data in the template files and generates the information for the validation services in the control plane. This information is in a well-defined switch agnostic format. The TOR service gathers generic information about the network switch (model, version, vendor, etc.), information about FE ports, port channels, ICL, VLANs, MAC tables, etc.

One beneficial feature of the TOR service is that it allows to significantly reduce the time required to gather data from the switches by performing switch side filtering instead of polling information about all objects. The control plane performance of network switches is often very poor, so this method allows reduction of data gathering time from several minutes to a few seconds. The data for filtering may be provided using the information obtained from L2D and PLT services.

In some implementations, validation process 10 may include a platform configuration and validation service (PLT) 1500 (as shown in the example implementation of FIG. 15), which may be responsible for three major tasks:

The configuration of the non-persistent temporary network on the unconfigured storage controller during INV and CEV.

The configuration of the sandbox network environment on the configured storage controller during PRV.

Providing a common command execution service to the control plane with the support of the execution of the commands on the storage controller itself and, in case of the virtualized storage controller, on the hypervisor. In example INV and CEV use-cases, the unconfigured storage controller has no IP addresses, routing, VLANs and other network related information configured. In order to get access to the physical switches (via TOR) and infrastructure services (via ENV), some kind of temporary network configuration should be done on the storage controller. This is performed by the PLT service. The control plane supplies the parameters of the management network (IP address and prefix length, gateway address, VLAN ID, etc.), the list of DNS servers and other mandatory information in the command sent to PLT and PLT takes care of configuration on the platform side. Once that is done, the control plane may communicate to ENV and TOR services and then ask PLT to destroy the temporary network.

In PRV use-case, when the user wants to reconfigure the network, it may be important to perform the network validation checks of the new configuration in an isolated sandbox. This is generally needed to make sure that existing production configuration is not affected by any changes required for the PRV. PLT service takes care of such sandbox network configuration which, depending on the OS and required configuration change may be implemented as a lightweight VM, container, network namespace or even VRF. Once the sandbox is configured, the control plane may request PLT to create a temporary network there and direct TOR and ENV services to use that sandbox for all commands.

PLT service also provides a high-level well-defined interface for the execution of the commands on the storage controller or on the hypervisor host in case of virtualized or HCI deployments. This allows the control plane to execute allowed commands directly if some functionality is missing in the platform validation service.

Table 4 summarizes the minimal set of claimed validation checks supported by the proposed solution. Additional checks may be further implemented on top of this architecture by adding more validation backend services on the platform and extending the validation business logic in a distributed control plane.

TABLE 4

| # | Validation check | Category | Details |
|---|---|---|---|
| | Check of duplicate IP addresses specified for the single network | User input validation | This just input data validation and not the real ACD which is done later |
| | Check that supplied gateway IP address is not the same as one of the IP addresses to be assigned to the storage cluster | User input validation | |
| | Check that all IP addresses specified for a network belong to the same IP subnet | User input validation | |
| | Check that all IP addresses are well formed and belong to the same IP version | User input validation | |
| | Check that supplied IP addresses do not belong to some reserved IP ranges | User input validation | For example, it's not allowed to manually configure IPv4 link-local addresses from 169.254.0.0/16 subnet |
| | Check that supplied VLAN ID is in the correct range | User input validation | |
| | Check cross-network compatibility | User input validation | Some storage systems may require different IP subnets and/or VLANs to be configured for each network. This check makes sure that provided IP addresses and VLANs are distinct. |
| | Check that provided IP addresses are not the same as addresses of the infrastructure services which are supposed to be external | User input validation | For example, if the storage cluster requires the DNS server, then the same IP address cannot be assigned to the storage controller |
| | Check that all external infrastructure services are reachable via the management network | User input validation | This check covers the case when management network gateway is not provided and infrastructure services have IP addresses from a different subnet |
| | Check that all hostnames provided are well formed and obey the standards | User input validation | |

TABLE 4-continued

| # | Validation check | Category | Details |
|---|---|---|---|
| | Check that the provided IP address of the DNS server belongs to the real DNS server | Infrastructure services validation | The validation is performed via the DNS protocol |
| | Check that the DNS server is able to resolve all hostnames which are provided by the user | Infrastructure services validation | The validation is performed via the DNS protocol and takes IP version into account (i.e. IPv4/IPv6 and A/AAAA records) |
| | Check that the provided address of the NTP server belongs to the real NTP server | Infrastructure services validation | The validation is performed via the NTP protocol |
| | Check that the provided address of the vCenter server belongs to the real vCenter server instance and the credentials are valid | Infrastructure services validation | The validation is done via vSphere APIs |
| | Check that the vCenter server has the expected version | Infrastructure services validation | The validation is done via vSphere APIs |
| | Check that the vCenter server has the expected license installed | Infrastructure services validation | The validation is done via vSphere APIs |
| | Check that the provided address of the SMPT server belongs to the real SMTP server | Infrastructure services validation | The validation is performed via the SMTP protocol |
| | Check that the provided address of the HTTP(s) proxy server belongs to the real HTTP(s) proxy server | Infrastructure services validation | The validation is performed via the HTTP(s) protocol |
| | Check that the IP address has no duplicates in the specified VLAN | Address conflict detection | The validation is performed via ARP for IPv4 and NDP for IPv6. Both on-demand and ongoing address conflict detection are supported. |
| | Check that the FE ports on the switches are configured in the expected port mode (trunk/access/hybrid) | Physical switches validation | The validation is performed by reading the configuration of the switches via TOR service |
| | Check that the FE ports on the switches are configured in the expected STP mode (EdgePort, PortFast, etc) | Physical switches validation | The validation is performed by reading the configuration of the switches via TOR service |
| | Check that the FE ports on the switches are configured with the expected port speed | Physical switches validation | The validation is performed by reading the configuration of the switches via TOR service |
| | Check that the FE ports on the switches are configured with the expected MTU | Physical switches validation | The validation is performed by reading the configuration of the switches via TOR service |
| | Check that inter-chassis link (ICL) between the switches is configured correctly | Physical switches validation | The validation is performed by reading the configuration/ state of the switches via TOR service |
| | Check that the IP address of the physical switches provided belongs to the switch where storage controllers are physically connected to | Physical switches validation | The validation is performed by reading the configuration/state of the switches via TOR service and information obtained via L2D service |
| | Check that storage controller are connected to the HA pair of switches of the same vendor and model | Physical switches validation | The validation is performed by reading the configuration/state of the switches via TOR service and information obtained via L2D service |
| | Check that link-layer discovery protocols (CDP/LLDP) are enabled on the switches | Physical switches validation | The validation is performed by reading the configuration/state of the switches via TOR service and information obtained via L2D service |
| | Check that native VLAN is consistently configured on FE ports of the switches | Physical switches validation | The validation is performed by reading the configuration/state of the switches via TOR service and information obtained via L2D service |
| | Check that allowed VLANs are configured on FE ports of the switches | Physical switches validation | The validation is performed by reading the configuration/state of the switches via TOR service and information obtained via L2D service |
| | Check that required port channels are configured on the physical switches | Physical switches validation | The validation is performed by reading the configuration/state of the switches via TOR service |
| | Check that all mandatory ports are up | Cabling validation | The validation is performed via L2D, PLT and TOR services |
| | Check that the ports of the storage controller are connected to different physical switches to avoid SPOF | Cabling validation | The validation is performed via L2D service |
| | Check that partner ports of the dual controller storage appliance are connected to different physical switches to avoid SPOF | Cabling validation | The validation is performed via L2D service |
| | Check that the management port is connected to the right switch (i.e. OOB management switch) | Cabling validation | This check is performed using the information obtained via TOR and L2D services. It is needed when OOB management network configuration is desired |

TABLE 4-continued

| # | Validation check | Category | Details |
|---|---|---|---|
| | Check that all LACP bonds are not in a degraded state | Runtime checks | This check is done via the PLT service by reading the status of LACP bond. It may be degraded if some ports are down or if the port channel is not properly configured on the switch side |
| | Check IP connectivity within the cluster in a full mesh fashion with payload size adjusted to the network MTU and IP fragmentation disabled | Runtime checks | This check is done via PLT service. It makes sure that MTU is properly configured everywhere in the cluster and all required VLANs are enabled |
| | Check hardware and protocol error counters (dropped frames, CRC errors, etc) on the ports of the storage controller and FE ports of the switches | Runtime checks | The check is done via PLT and TOR services |
| | Check consistency of the virtual network configuration on the virtualization manager and the hypervisor hosts in case of virtualized and/or HCI deployments | Runtime checks | This check is done to make sure that the configured virtual switches, port groups, and other hypervisor objects are configured according to the expectations of the storage cluster (i.e. to catch issues when the configuration is changed bypassing the storage cluster control plane) |

Below are at least some of the example benefits of the single unified software architecture of validation process 10:

Covers all major network validation use-cases for the heterogeneous storage clusters via the single unified software architecture: initial network validation, cluster expansion validation, pre-reconfiguration validation, and ongoing network validation.

All validation checks are cluster-wide which allows catching all problems with compatibility of storage appliances at the cluster level and allows to do meaningful RCA because all information is available for the validation engine.

Fully supports heterogeneous clusters (bare-metal and virtualized controllers in the same cluster) and multiple network fabrics.

A native network validation support as a part of the core software stack of the storage cluster which allows supporting all possible validation checks, does not require any external tools and significantly simplifies the user experience.

Supports integration with the discovery service which means that the end user may find out that the storage controller is not healthy even before first touching it directly from the service discovery records.

The validation reports provided by the solution are as complete as possible which allows minimizing the number of times a user needs to re-run the network validation after some issues are fixed.

Advanced protocol-level validation of all external infrastructure services which makes the checks very reliable.

The solution is multi-source and multi-protocol capable by design so it is able to use data from different sources (e.g., L2D and TOR services) and data obtained via different protocols (e.g., CDP/LLDP, SSH/SNMP) in a unified way.

Designed so that the core validation business logic may be thoroughly tested by simple unit tests without the need for complex network setup, complicated fault-injection scenarios, and system/integration testing.

Designed to work fine with incomplete input data, e.g., missing credentials for the switches, disabled Layer 2 discovery protocols, etc.—produced validation reports are based on the available data and the system has effectively zero pre-configuration requirements.

The switch template files can installed dynamically on-demand which means it is not needed to upgrade the storage cluster itself to support a new vendor or switch model.

An extensible architecture so it is easier to extend it by adding new validation services, new switch templates, support of new protocols, etc.

Integration of fully automatic passive network validation (e.g., based on link-layer discovery protocols or other protocols) with the service discovery for the storage cluster.

In some implementations, as discussed throughout, validation process 10 may (e.g., via the single unified architecture) provide 608 resolution suggestions for all found issues based on multiple sources of information and validation report compaction (e.g., via partial execution of the validation checks based on the dependency graph and optional RCA phase). In addition to reporting the list of detected issues, validation process 10 provides the end user with the possible resolution suggestions for the found problems. Support of both configuration based and runtime based validation. Moreover, it uses both sources to provide better resolutions and RCA.

In some implementations, testing and qualification of the core network validation business logic may occur without hardware test beds and fault injection frameworks. Software architecture which significantly simplifies testing and qualification of the core validation business logic without the need of the expensive hardware test beds and complicated fault injection frameworks.

An approach of gathering data from heterogeneous network switches based on multi-vendor templates which are decoupled from the core software stack of the storage cluster and can be installed/updated independently.

Advanced protocol-level validation of all infrastructure services.

While particular components and configurations of the single unified software architecture are shown, it will be appreciated that other configurations and more or less components that may share abilities may also be used without departing from the scope of the present disclosure. Additionally, while the single unified software architecture is described as working with various protocols, more or less protocols may also be enabled for use with the single unified software architecture without departing from the scope of the present disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
    performing, by a single unified architecture, an initial network validation, wherein the initial network validation is performed before a storage cluster is fully configured;
    performing, by the single unified architecture, a cluster expansion validation, wherein the cluster expansion validation is performed before at least one of a new storage application and a new storage controller is added into the storage cluster;
    performing, by the single unified architecture, a pre-reconfiguration validation, wherein the pre-reconfiguration validation is performed as a network reconfiguration operation in the storage cluster before a network reconfiguration request is processed; and
    performing, by the single unified architecture, ongoing network validation, wherein the ongoing network validation is performed periodically as a background process.

2. The computer-implemented method of claim 1 wherein the single unified architecture includes cluster-wide validation business logic supporting heterogeneous storage clusters, multiple network fabrics, and asymmetric network connectivity.

3. The computer-implemented method of claim 1 wherein the single unified architecture includes native multi-source and multi-protocol support in a core network validation business logic and validation services.

4. The computer-implemented method of claim 3 wherein testing and qualification of the core network validation business logic occurs without hardware test beds and fault injection frameworks.

5. The computer-implemented method of claim 1 further comprising providing resolution suggestions for all found issues based on multiple sources of information and validation report compaction.

6. The computer-implemented method of claim 1 wherein the ongoing network validation is an automatic passive network validation.

7. The computer-implemented method of claim 1 further comprising gathering data from heterogeneous network switches in the storage cluster based on multi-vendor templates, wherein the multi-vendor templates are decoupled from a core software stack of the storage cluster and configured to be installed and updated independently.

8. A computer program product residing on a non-transitory computer readable storage medium having a plurality of instructions stored thereon which, when executed across one or more processors, causes at least a portion of the one or more processors to perform operations comprising:
    performing, by a single unified architecture, an initial network validation, wherein the initial network validation is performed before a storage cluster is fully configured;
    performing, by the single unified architecture, a cluster expansion validation, wherein the cluster expansion validation is performed before at least one of a new storage application and a new storage controller is added into the storage cluster;
    performing, by the single unified architecture, a pre-reconfiguration validation, wherein the pre-reconfiguration validation is performed as a network reconfiguration operation in the storage cluster; and
    performing, by the single unified architecture, ongoing network validation, wherein the ongoing network validation is performed periodically as a background process.

9. The computer program product of claim 8 wherein the single unified architecture includes cluster-wide validation business logic supporting heterogeneous storage clusters, multiple network fabrics, and asymmetric network connectivity.

10. The computer program product of claim 8 wherein the single unified architecture includes native multi-source and multi-protocol support in a core network validation business logic and validation services.

11. The computer program product of claim 10 wherein testing and qualification of the core network validation business logic occurs without hardware test beds and fault injection frameworks.

12. The computer program product of claim 8 wherein the operations further comprise providing resolution suggestions for all found issues based on multiple sources of information and validation report compaction.

13. The computer program product of claim 8 wherein the ongoing network validation is an automatic passive network validation.

14. The computer program product of claim 8 wherein the operations further comprise gathering data from heterogeneous network switches in the storage cluster based on multi-vendor templates, wherein the multi-vendor templates are decoupled from a core software stack of the storage cluster and configured to be installed and updated independently.

15. A computing system including one or more processors and one or more memories configured to perform operations comprising:

performing, by a single unified architecture, an initial network validation, wherein the initial network validation is performed before a storage cluster is fully configured;

performing, by the single unified architecture, a cluster expansion validation, wherein the cluster expansion validation is performed before at least one of a new storage application and a new storage controller is added into the storage cluster;

performing, by the single unified architecture, a pre-reconfiguration validation, wherein the pre-reconfiguration validation is performed as a network reconfiguration operation in the storage cluster; and performing, by the single unified architecture, ongoing network validation, wherein the ongoing network validation is performed periodically as a background process.

16. The computing system of claim 15 wherein the single unified architecture includes cluster-wide validation business logic supporting heterogeneous storage clusters, multiple network fabrics, and asymmetric network connectivity.

17. The computing system of claim 15 wherein the single unified architecture includes native multi-source and multi-protocol support in a core network validation business logic and validation services.

18. The computing system of claim 15 wherein the operations further comprise providing resolution suggestions for all found issues based on multiple sources of information and validation report compaction.

19. The computing system of claim 15 wherein the ongoing network validation is an automatic passive network validation.

20. The computing system of claim 15 wherein the operations further comprise gathering data from heterogeneous network switches in the storage cluster based on multi-vendor templates, wherein the multi-vendor templates are decoupled from a core software stack of the storage cluster and configured to be installed and updated independently.

* * * * *